(12) United States Patent (10) Patent No.: US 12,691,707 B2
Washizu et al. (45) Date of Patent: Jul. 28, 2026

---

(54) TIRE

(71) Applicant: SUMITOMO RUBBER INDUSTRIES, LTD., Kobe (JP)

(72) Inventors: Kensuke Washizu, Kobe (JP); Kazuo Hochi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 119 days.

(21) Appl. No.: 18/713,486

(22) PCT Filed: Nov. 24, 2022

(86) PCT No.: PCT/JP2022/043390
§ 371 (c)(1),
(2) Date: May 24, 2024

(87) PCT Pub. No.: WO2023/095837
PCT Pub. Date: Jun. 1, 2023

(65) Prior Publication Data
US 2025/0018747 A1     Jan. 16, 2025

(30) Foreign Application Priority Data
Nov. 25, 2021     (JP) ................................. 2021-191484

(51) Int. Cl.
B60C 11/00          (2006.01)
B60C 1/00           (2006.01)
(Continued)

(52) U.S. Cl.
CPC .......... B60C 11/005 (2013.01); B60C 1/0016 (2013.01); C08L 7/00 (2013.01);
(Continued)

(58) Field of Classification Search
CPC ...................... B60C 11/005; B60C 2011/0025
See application file for complete search history.

(56) References Cited

U.S. PATENT DOCUMENTS

| | | | | |
|---|---|---|---|---|
| 2014/0251519 | A1* | 9/2014 | Piffard | B60C 11/11 |
| | | | | 152/209.5 |
| 2017/0267027 | A1* | 9/2017 | Kunisawa | C08L 9/06 |

(Continued)

FOREIGN PATENT DOCUMENTS

| | | |
|---|---|---|
| CN | 111386200 A | 7/2020 |
| CN | 112980069 A | 6/2021 |

(Continued)

OTHER PUBLICATIONS

Machine translation for Japan 2012-111795 (Year: 2025).*

(Continued)

*Primary Examiner* — Steven D Maki
(74) *Attorney, Agent, or Firm* — Birch, Stewart, Kolasch & Birch, LLP

(57)          ABSTRACT

Provided is a tire comprising a tread at least having two layers each comprising a rubber component and a plasticizer, wherein a difference ($AE_1$–$AE_2$) between an acetone extraction amount $AE_1$ of the rubber composition of the first layer and an acetone extraction amount $AE_2$ of the rubber composition of the second layer is greater than 6.0% by mass, and wherein, with the first layer and the second layer being attached together, when they are applied with a dynamic stimulus under a condition of a dynamic stress of 0.45 MPa, a frequency of 50 Hz, and a temperature at 80° C. for 120 hours, a rate of change in acetone extraction amount of the rubber composition of the first layer before and after being applied with the predetermined dynamic stimulus is –10% or more and 10% or less.

12 Claims, 1 Drawing Sheet

(51) Int. Cl.
    *C08L 7/00*       (2006.01)
    *C08L 9/06*       (2006.01)

(52) U.S. Cl.
    CPC ......... *C08L 9/06* (2013.01); *B60C 2011/0025*
          (2013.01); *C08L 2205/02* (2013.01)

(56) References Cited

U.S. PATENT DOCUMENTS

| | | |
|---|---|---|
| 2018/0236815 A1 | 8/2018 | Yokoyama et al. |
| 2020/0079936 A1 * | 3/2020 | Ito ........................... C08L 21/00 |
| 2020/0331296 A1 | 10/2020 | Sugimoto et al. |
| 2022/0389206 A1 | 12/2022 | Kitago et al. |

FOREIGN PATENT DOCUMENTS

| | | | |
|---|---|---|---|
| EP | 0 500 338 B1 | 5/1995 | |
| EP | 3872129 A1 * | 9/2021 | ................ C08L 9/06 |
| EP | 3950381 A1 | 2/2022 | |
| EP | 4056639 A1 | 9/2022 | |
| EP | 4166354 A1 * | 4/2023 | ........... B60C 11/005 |
| JP | 2000-248120 A | 9/2000 | |
| JP | 2005-67236 A | 3/2005 | |
| JP | 4357227 B2 | 11/2009 | |
| JP | 2012-111795 A * | 6/2012 | |
| JP | 2014-162242 A | 9/2014 | |
| JP | 2017-227597 A * | 12/2017 | |
| JP | 2020-41077 A | 3/2020 | |
| JP | 6945806 B1 | 10/2021 | |
| JP | 2022-86476 A | 6/2022 | |
| JP | 2022-139989 A | 9/2022 | |
| WO | WO 2021/079584 A1 | 4/2021 | |
| WO | WO-2021/256123 A1 * | 12/2021 | ........... B60C 19/122 |

OTHER PUBLICATIONS

Machine translation for Japan 2017-227597 (Year: 2025).*
Chinese Office Action and Search Report for Chinese 202280064799.3, dated Jul. 24, 2024, with English translation of the Office Action.
International Search Report, issued in PCT/JP2022/043390, PCT/ISA/210, dated Feb. 7, 2023.
Written Opinion of the International Searching Authority, issued in PCT/JP2022/043390, PCT/ISA/237, dated Feb. 7, 2023.
Extended European Search Report for European Application No. 22898619.6, dated Oct. 31, 2025.

\* cited by examiner

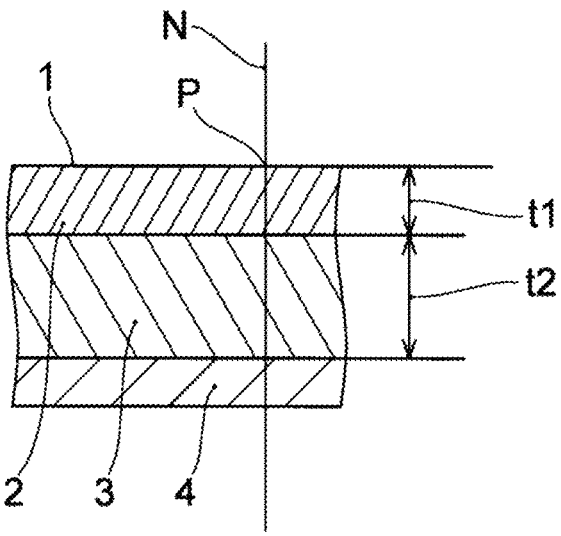

TIRE

TECHNICAL FIELD

The present invention relates to a tire.

BACKGROUND ART

Patent Document 1 discloses a tire comprising a tread part, the tread part comprising a cap rubber layer that touches a road surface and a base rubber layer that is located on an inner side in a tire radial direction with respect to the cap rubber.

PRIOR ART DOCUMENT

Patent Document

Patent Document 1: JP 2014-162242 A

SUMMARY OF THE INVENTION

Problem to be Solved by the Invention

However, in a case of a tire comprising a tread having a plurality of rubber layers as described above, there is a problem that the cap rubber layer that touches a road surface hardens over time due to running, thereby deteriorating wet grip performance. Here, since hardness of the rubber varies greatly depending on a thickness or a surface roughness of the rubber, it has been desired for developing a technique for predicting and controlling a change in hardness of the cap rubber layer over time.

It is an object of the present invention to provide a tire capable of maintaining wet grip performance even after abrasion.

Means to Solve the Problem

It has been found, in a tire comprising a tread at least having a first layer constituting a tread surface and a second layer adjacent to an inner side of the first layer in a radial direction, that a change in rubber hardness over time occurs due to diffusion of a plasticizer from the first layer to the second layer, and that a degree of diffusion of the plasticizer can be judged by a change in acetone extraction amount of the second layer over time. Therefore, after further intensive studies, it has been found that the above-described problems can be solved by setting a difference between an acetone extraction amount of a rubber composition of the first layer and an acetone extraction amount of a rubber composition of the second layer to a predetermined range and setting a rate of change in acetone extraction amount of the rubber composition of the first layer before and after being applied with a predetermined dynamic stimulus to a predetermined range.

That is, the present invention relates to a tire comprising a tread at least having a first layer constituting a tread surface and a second layer adjacent to an inner side of the first layer in a radial direction, wherein the first layer and the second layer are each composed of a rubber composition comprising a rubber component and a plasticizer, wherein a difference ($AE_1$–$AE_2$) between an acetone extraction amount $AE_1$ of the rubber composition of the first layer and an acetone extraction amount $AE_2$ of the rubber composition of the second layer is greater than 6.0% by mass, and wherein, with the first layer and the second layer being attached together, when they are applied with a dynamic stimulus under a condition of a dynamic stress of 0.45 MPa, a frequency of 50 Hz, and a temperature at 80° C. for 120 hours, a rate of change in acetone extraction amount of the rubber composition of the first layer before and after being applied with the predetermined dynamic stimulus is –10% or more and 10% or less.

Effect of the Invention

According to the present invention, provided is a tire capable of maintaining wet grip performance even after abrasion.

BRIEF DESCRIPTION OF THE DRAWINGS

FIG. 1 is a cross-sectional view showing a part of a tread of a tire according to one embodiment of the present invention.

EMBODIMENT FOR CARRYING OUT THE INVENTION

The tire that is one embodiment of the present invention is a tire comprising a tread at least having a first layer constituting a tread surface and a second layer adjacent to an inner side of the first layer in a radial direction, wherein the first layer and the second layer are each composed of a rubber composition comprising a rubber component and a plasticizer, wherein a difference ($AE_1$–$AE_2$) between an acetone extraction amount $AE_1$ of the rubber composition of the first layer and an acetone extraction amount $AE_2$ of the rubber composition of the second layer is greater than 6.0% by mass, and wherein, with the first layer and the second layer being attached together, when they are applied with a dynamic stimulus under a condition of a dynamic stress of 0.45 MPa, a frequency of 50 Hz, and a temperature at 80° C. for 120 hours, a rate of change in acetone extraction amount of the rubber composition of the first layer before and after being applied with the predetermined dynamic stimulus is –10% or more and 10% or less.

Although it is not intended to be bound by theory, the following can be considered as a mechanism by which the tire of the present invention suppresses the change in hardness of the tread over time. That is, by setting the difference between the acetone extraction amount of the rubber composition of the first layer and the acetone extraction amount of the rubber composition of the second layer to a predetermined range and setting the rate of change in acetone extraction amount before and after being applied with a predetermined dynamic stimulus to a predetermined range, diffusion of the plasticizer from the first layer to the second layer can be appropriately controlled. From this, it is considered that remarkable effects of appropriately controlling the change in hardness of the rubber layer of the tread surface due to use of the tire and maintaining wet grip performance for a long period of time are achieved.

In the tire of the present invention, a tan δ at 30° C. of the rubber composition of the first layer is preferably less than 0.20, more preferably less than 0.15.

When the tan δ of the rubber composition of the first layer is less than the above-described values, heat generation during running is reduced, so that it is considered that hardening of the first layer over time is suppressed.

The plasticizer preferably comprises at least one of oil and an ester-based plasticizer.

It is considered that, when the plasticizer comprises at least one of an oil and an ester-based plasticizer which have a fast diffusion velocity, hardening of the first layer over time can be suppressed.

The plasticizer preferably comprises at least one of a resin component and a liquid polymer.

When the plasticizer comprises at least one of a resin component and a liquid polymer which have a slow diffusion velocity, diffusion of the plasticizer from the first layer to the second layer can be suppressed, and hardening of the first layer over time due to use of the tire can be suppressed.

A difference between a content of the plasticizer in the rubber composition of the first layer and a content of the plasticizer in the rubber composition of the second layer, based on 100 parts by mass of the rubber component, is preferably 10 parts by mass or more.

It is considered that, when the difference between the compounding amount of the plasticizer in the rubber composition of the first layer and the compounding amount of the plasticizer in the rubber composition of the second layer is 10 parts by mass or more, hardening of the first layer overtime can be suppressed.

A rate of change in complex elastic modulus at 0° C. (0° C. E*) of the rubber composition of the first layer before and after being applied with the dynamic stimulus is preferably greater than −20% and less than 20%, and a rate of change in tan δ at 0° C. (0° C. tan δ) is preferably greater than −20% and less than 20%.

It is considered that, when the rates of change in 0° C. E* and 0° C. tan δ of the rubber composition of the first layer before and after being applied with the dynamic stimulus are set to greater than −20% and less than 20%, hardening of the first layer over time due to use of the tire can be further suppressed, and wet grip performance can be maintained until the end period of abrasion.

The 0° C. E* of the rubber composition of the first layer is preferably 4.0 MPa or more from the viewpoint of effects of the present invention.

The 0° C. tan δ of the rubber composition of the first layer is preferably 0.10 or more from the viewpoint of the effects of the present invention.

A glass transition temperature of the rubber composition of the first layer is preferably −40° C. or higher.

It is considered that, when the glass transition temperature of the rubber composition of the first layer is −40° C. or higher, a loss tangent tan δ in a temperature range higher than the Tg tends to become higher compared with a case where it is lower than −40° C., so that the effects of the present invention can be exhibited more easily.

An elongation at break of the rubber composition of the first layer as measured according to JIS K 6251: 2017 is preferably 200% or more.

It is considered that, when the elongation at break of the rubber composition of the first layer is set to 200% or more, a surface condition of the tire at the time of abrasion becomes easy to be more smoothly maintained, and a decrease in actual grounding area is suppressed, so that, as a result, deterioration of wet grip performance after tire abrasion can be suppressed.

Definition

A "standardized rim" is a rim in a standard system including a standard, on which the tire is based, defined for each tire by the standard, i.e., a "standard rim" in JATMA, "Design Rim" in TRA, or "Measuring Rim" in ETRTO.

A "standardized internal pressure" is an air pressure in a standard system including a standard on, which the tire is based, defined for each tire by the standard, i.e., a "MAXIMUM AIR PRESSURE" in JATMA, a maximum value described in Table "TIRE LOAD LIMITS AT VARIOUS COLD INFLATION PRESSURES" in TRA, or "INFLATION PRESSURE" in ETRTO.

A "standardized state" is a state where the tire is rim-assembled on a standardized rim, a standardized internal pressure is filled, and no load is applied. In the present specification, a dimension of each part of a tire (t1, t2, or the like) is measured in the above-described standardized state, unless otherwise specified.

A "plasticizer" is a material that imparts plasticity to a rubber component, which is a component extracted from a rubber composition using acetone. The plasticizer includes a liquid plasticizer (a plasticizer that is liquid (in a liquid state) at 25° C.) and a solid plasticizer (a plasticizer that is solid at 25° C.).

A "diffusion velocity of a plasticizer" means a speed at which the plasticizer diffuses from one rubber layer to a rubber layer adjacent thereto. A magnitude of the diffusion velocity when comparing different plasticizers can be evaluated by the following method. That is, a vulcanized rubber sheet of the first layer comprising a plasticizer and a vulcanized rubber sheet of the second layer obtained by the same compounding and manufacturing methods as for the vulcanized rubber sheet of the first layer, except that it does not comprise a plasticizer, are attached together with the same area and thickness. The attached vulcanized rubber sheet is left to stand under a condition of a temperature at 80° C. for 480 hours while being applied with a load of 500 g from a thickness direction of the first layer to a thickness direction of the second layer, and then separated into a first layer and a second layer, respectively, to measure a weight of the second layer. This process is performed with each of different plasticizers, and the measurements are indicated as indexes with an initial weight of the second layer before loading being as 100. The results show that the larger the index is, the larger the amount of the plasticizer compounded in the first layer that diffuses into the second layer is, and the faster the diffusion velocity of the plasticizer is.

A "dynamic stimulus" means that, with a first layer and a second layers being attached together, a dynamic stress is repeatedly applied in a direction perpendicular to the attached surface. By applying such a dynamic stimulus to the attached rubber layer, diffusion of a plasticizer from the first layer to the second layer is facilitated. A magnitude of the dynamic stress is set so that the rubber composition of each of the first layer and the second layer is not destroyed, that is, the dynamic stress can be repeatedly applied, as described below. In the present embodiment, various physical properties (acetone extraction amount, loss tangent tan δ, complex elastic modulus E*, etc.) of the rubber composition of the first layer before and after being applied with a dynamic stimulus are measured.

An "oil content" also includes an amount of oil contained in the oil-extended rubber.

<Measuring Method>

An "acetone extraction amount" can be calculated by the following equation by immersing each vulcanized rubber test piece in acetone for 72 hours to extract a soluble component and measuring a mass of each test piece before and after extraction in accordance with JIS K 6229: 2015. A sample for measuring the acetone extraction amount is a vulcanized rubber composition having a length of 1 mm, a width of 1 mm, and a thickness of 1 mm. When it is produced by being cut out from a tire, it is cut out from a tread part of the tire so that a tire circumferential direction becomes a long side and a tire radial direction becomes a thickness direction.

$$\text{(Acetone extraction amount (\% by mass))} = \{(\text{mass of rubber test piece before extraction} - \text{mass of rubber test piece after extraction})/(\text{mass of rubber test piece before extraction})\} \times 100$$

A "difference between acetone extraction amounts" can be calculated from a difference between acetone extraction amounts of rubber compositions of adjacent rubber layers. For example, when an acetone extraction amount of a rubber composition of a first layer is defined as $AE_1$ (%) and an acetone extraction amount of a rubber composition of a second layer is defined as $AE_2$ (%), a difference between them can be calculated by $AE_1 - AE_2$.

A "dynamic test" is performed, with a first layer and a second layer being attached together, by applying a dynamic stimulus in a direction perpendicular to the attached surface for 120 hours under a condition of a dynamic stress of 0.45 MPa, a frequency of 50 Hz, and a temperature at 80° C., using a dynamic viscoelastic device (e.g., EPLEXOR series manufactured by gabo Systemtechnik GmbH). In a case where a sample is produced by being cut out from a tire, it is cut out with 30 mm in length×30 mm in width×10 mm in thickness from a tread part of the tire, including an interface between a first layer and a second layer, so that thicknesses of the first layer and the second layer become the same. Besides, a long side of the sample is defined as a tire circumferential direction, and a thickness direction of the sample is defined as a tire radial direction.

A "rate of change (%) in acetone extraction amount before and after application of a dynamic stimulus" can be calculated by measuring an acetone extraction amount before and after applying a dynamic stimulus to each vulcanized rubber test piece and using the following equation.

$$\text{(Rate of change in acetone extraction amount before and after application of dynamic stimulus (\%))} = \{(\text{acetone extraction amount after application of dynamic stimulus})/(\text{acetone extraction amount before application of dynamic stimulus}) \times 100\} - 100$$

A "tan δ at 30° C. (30° C. tan δ)" is a loss tangent measured using a dynamic viscoelasticity measuring device (e.g., EPLEXOR series manufactured by gabo Systemtechnik GmbH) under a condition of a temperature at 30° C., an initial strain of 5%, a dynamic strain of 1%, and a frequency of 10 Hz. A sample for measuring the loss tangent is a vulcanized rubber composition of 20 mm in length×4 mm in width×1 mm in thickness. When it is produced by being cut out from a tire, it is cut out from a tread part of the tire so that a tire circumferential direction becomes a long side and a tire radial direction becomes a thickness direction.

A "tan δ at 0° C. (0° C. tan δ)" is a loss tangent measured using a dynamic viscoelasticity measuring device (e.g., EPLEXOR series manufactured by gabo Systemtechnik GmbH) under a condition of a temperature at 0° C., an initial strain of 10%, a dynamic strain of 2.5%, and a frequency of 10 Hz. A sample for measuring the 0° C. tan δ is produced in the similar manner as in the case for the 30° C. tan δ.

A "rate of change (%) in 0° C. tan δ before and after application of a dynamic stimulus" can be calculated by measuring 0° C. tan δ before and after applying a dynamic stimulus to each vulcanized rubber test piece and using the following equation.

$$\text{(Rate of change in 0° C. tan δ before and after application of dynamic stimulus (\%))} = \{(0° \text{ C.}$$

tan δ after application of dynamic stimulus)/(0° C. tan δ before application of dynamic stimulus)×100} - 100

A "complex elastic modulus E* at 0° C. (0° C. E*)" is a complex elastic modulus measured using a dynamic viscoelasticity measuring device (e.g., EPLEXOR series manufactured by gabo Systemtechnik GmbH) under a condition of a temperature at 0° C., an initial strain of 10%, a dynamic strain of 2.5%, and a frequency of 10 Hz. A sample for measuring the 0° C. E* is produced in the similar manner as in the case for the 30° C. tan δ.

A "rate of change in 0° C. E* before and after application of a dynamic stimulus" can be calculated by measuring 0° C. E* before and after applying a dynamic stimulus to each vulcanized rubber test piece and using the following equation.

$$\text{(Rate of change in 0° C. } E^* \text{ before and after application of dynamic stimulus (\%))} = \{(0° \text{ C. } E^* \text{ after application of dynamic stimulus})/(0° \text{ C. } E^* \text{ before application of dynamic stimulus}) \times 100\} - 100$$

A "glass transition temperature (Tg) of a rubber composition" is determined as a temperature corresponding to a largest tan δ value (tan δ peak temperature) in a temperature distribution curve of tan δ obtained by measurement, under a condition of a frequency of 10 Hz, an initial strain of 10%, an amplitude of ±0.5%, and a temperature rising rate at 2° C./min, using a dynamic viscoelasticity measuring device (e.g., EPLEXOR series manufactured by gabo Systemtechnik GmbH). A sample for measuring the Tg is produced in the similar manner as in the case for the 30° C. tan δ.

A "elongation at break (EB)" is a value measured by producing a dumbbell-shaped No. 7 test piece with a thickness of 1 mm, which is cut out from inside of a rubber layer of a tread part of each test tire so that a tire circumferential direction became a tensile direction, and performing a tensile test under a condition of a tensile speed of 3.3 mm/sec in an atmosphere at 23° C., according to JIS K 6251: 2017. Besides, a thickness direction of a sample is defined as a tire radial direction.

A "styrene content" is a value calculated by $^1$H-NMR measurement, and is applied to, for example, a rubber component having a repeating unit derived from styrene such as a SBR and the like. A "vinyl content (1,2-bond butadiene unit amount)" is a value calculated by infrared absorption spectrometry according to JIS K 6239-2: 2017, and is applied to, for example, a rubber component having a repeating unit derived from butadiene such as a SBR, a BR, and the like. A "cis content (cis-1,4-bond butadiene unit amount)" is a value calculated by infrared absorption spectrometry according to JIS K 6239-2: 2017, and is applied to, for example, a rubber component having a repeating unit derived from butadiene such as a BR and the like.

A "weight-average molecular weight (Mw)" can be calculated in terms of a standard polystyrene based on measurement values obtained by a gel permeation chromatography (GPC) (e.g., GPC-8000 Series manufactured by Tosoh Corporation, detector: differential refractometer, column: TSKGEL SUPERMULTIPORE HZ-M manufactured by Tosoh Corporation). For example, it is applied to a SBR, a BR, a plasticizer, and the like.

A "nitrogen adsorption specific surface area ($N_2SA$) of carbon black" and an "oil absorption amount of carbon black (DBP oil absorption amount (OAN))" are measured according to JIS K 6217-2: 2017. A "nitrogen adsorption specific surface area ($N_2SA$) of silica" is measured by the BET method according to ASTM D3037-93.

A "glass transition point (Tg) of the plasticizer" is a value measured by differential scanning calorimetry (DSC) under a condition of a temperature rising rate of 10° C./min according to JIS K 7121: 2012.

A procedure for producing a tire that is one embodiment of the present invention will be described in detail below. However, the following descriptions are illustrative for explaining the present invention, and are not intended to limit the technical scope of the present invention to this description range only.

[Tire]

FIG. 1 is an enlarged cross-sectional view showing a part of a tread of a tire according to the present embodiment. FIG. 1 shows a part of the tread according to the present embodiment where no groove is formed on the tread surface.

As illustrated in FIG. 1, the tread part of the tire according to the present embodiment comprises a first layer 2 and a second layer 3, an outer surface of the first layer 2 forming a tread surface 1 and the second layer 3 being adjacent to the inside of the first layer 2 in a radial direction. The first layer 2 typically corresponds to a cap tread. The second layer 3 typically corresponds to a base tread or under tread. Moreover, as long as the object of the present invention is achieved, one or more rubber layers (a third layer 4 in FIG. 1) may be further provided between the third layer 3 and a belt layer.

In FIG. 1, the double-headed arrow t1 is a thickness of the first layer 2, and the double-headed arrow t2 is a thickness of the second layer 3. In FIG. 1, any point on a tread surface where no groove is formed is represented as a symbol P. A straight line represented by a symbol N is a straight line (a normal line) that passes through the point P and is perpendicular to a tangent plane at this point P. In the present specification, the thicknesses t1 and t2 are measured along the normal line N drawn from the point P on the tread surface at a position where no groove exists, in the cross section of FIG. 1.

In the present embodiment, the thickness t1 of the first layer 2 is, but not particularly limited to, preferably 1.0 mm or more, more preferably 1.5 or more, further preferably 2.0 or more, further preferably 3.0 or more, further preferably 4.0 or more, further preferably 5.0 or more, particularly preferably 6.0 mm or more, from the viewpoint of wet grip performance. On the other hand, the thickness t1 of the first layer 2 is preferably 10.0 mm or less, more preferably 9.0 mm or less, further preferably 8.0 mm or less, from the viewpoint of heat generation.

In the present embodiment, the thickness t2 of the second layer 3 is, but not particularly limited to, preferably 1.0 mm or more, more preferably 1.5 mm or more, further preferably 2.0 mm or more, particularly preferably 2.5 mm or more. Moreover, the thickness t2 of the second layer 3 is preferably 10.0 mm or less, more preferably 9.0 mm or less, further preferably 8.0 mm or less, further preferably 7.0 mm or less, further preferably 6.0 mm or less, particularly preferably 5.0 mm or less.

A ratio (t2/t1) of the thickness t2 of the second layer 3 to the thickness t1 of the first layer 2 is preferably 0.10 or more, more preferably 0.15 or more, further preferably 0.20 or more, from the viewpoint of fuel efficiency. On the other hand, it is preferably 1.10 or less, more preferably 0.90 or less, further preferably 0.70 or less, particularly preferably 0.50 or less, from the viewpoint of wet grip performance.

<<Acetone Extraction Amount>>

In the present embodiment, diffusion of the plasticizer from the first layer to the second layer can be measured with an acetone extraction amount. The acetone extraction amount is measured by the above-described measuring method. An acetone extraction amount of the first layer 2 before being applied with the dynamic stimulus is preferably 5.0% by mass or more, more preferably 8.0% by mass or more, further preferably 10.0% by mass or more, further preferably 15.0% by mass or more, particularly preferably 20.0% by mass or more. Moreover, the acetone extraction amount of the first layer 2 before being applied with the dynamic stimulus is preferably 40.0% by mass or less, more preferably 35.0% by mass or less, further preferably 30.0% by mass or less, further preferably 28.0% by mass or less, further preferably 25.0% by mass or less, particularly preferably 24.0% by mass or less. An acetone extraction amount of the second layer 3 before being applied with the dynamic stimulus is preferably 1.0% by mass or more, more preferably 3.0% by mass or more, further preferably 5.0% by mass or more, further preferably 7.0% by mass or more, further preferably 8.0% by mass or more, particularly preferably 10.0% by mass or more. Moreover, the acetone extraction amount of the second layer 3 before being applied with the dynamic stimulus is preferably 50.0% by mass or less, more preferably 40.0% by mass or less, further preferably 30.0% by mass or less, further preferably 25.0% by mass or less, further preferably 20.0% by mass or less, particularly preferably 15.0% by mass or less.

<<Difference in Acetone Extraction Amount>>

A difference ($AE_1-AE_2$) between an acetone extraction amount $AE_1$ of the rubber composition of the first layer and an acetone extraction amount $AE_2$ of the rubber composition of the second layer of the present embodiment is greater than 6.0% by mass, preferably 7.0% by mass or more, more preferably 8.0% by mass or more, further preferably 9.0% by mass or more. Moreover, an upper limit value of $AE_1-AE_2$ is not particularly limited from the viewpoint of the effects of the present invention, but is preferably 30% by mass or less, more preferably 27% by mass or less, further preferably 24% by mass or less, further preferably 21% by mass or less, further preferably 18% by mass or less, particularly preferably 15% by mass or less. Besides, $AE_1$ and $AE_2$ are acetone extraction amounts before application of the dynamic stimulus.

<<Rate of Change in Acetone Extraction Amount>>

When the first layer and the second layer are applied with the dynamic stimulus in a state where they are attached together, a rate of change in acetone extraction amount of the rubber composition of the first layer before and after being applied with the dynamic stimulus is −10% or more and 10% or less from the viewpoint of maintaining wet grip performance until the end period of abrasion. The rate of change is preferably −9% or more, preferably −8% or more. Moreover, the rate of change is preferably 7% or less, more preferably 3% or less, further preferably less than 0%, further preferably −1% or less, further preferably −2% or less, particularly preferably −3% or less.

<<30° C. tan δ>>

30° C. tan δ of the rubber composition of the first layer 2 is preferably less than 0.22, more preferably less than 0.20, further preferably less than 0.18, further preferably less than 0.16, further preferably less than 0.15, particularly preferably less than 0.14, from the viewpoint of reducing heat generation during running to suppress the first layer from hardening over time. Moreover, 30° C. tan δ of the rubber composition of the second layer 3 is preferably less than 0.40, more preferably less than 0.30, further preferably less than 0.20, particularly preferably less than 0.15. On the other hand, 30° C. tan δ of the rubber composition of each of the first layer 2 and the second layer 3 is preferably 0.05 or more, more preferably 0.07 or more, further preferably 0.09 or more. Besides, a value of 30° C. tan δ of the rubber composition of the first layer 2 is preferably larger than a value of 30° C. tan δ of the rubber composition of the second layer 3. A difference between 30° C. tan δ of the rubber composition of the first layer 2 and 30° C. tan δ of the rubber composition of the second layer 3 is preferably 0.01 or more, more preferably 0.02 or more. Besides, 30° C. tan δ of the rubber composition can be appropriately adjusted depending on types and compounding amounts of a rubber component, a plasticizer, etc.

<<Rate of Change in 0° C. E*>>

When the first layer and the second layer are applied with the dynamic stimulus in a state where they are attached together, a rate of change in 0° C. E* of the rubber composition of the first layer before and after being applied with the dynamic stimulus is greater than −20% and less than 20% from the viewpoint of maintaining wet grip performance until the end period of abrasion. The rate of change is preferably greater than −10%, more preferably greater than −5%, further preferably greater than −3%, further preferably greater than −1%, further preferably greater than 1%, particularly preferably greater than 3%. Moreover, the rate of change is preferably less than 19%, more preferably less than 18%, further preferably less than 17%, particularly preferably less than 16%.

<<Rate of Change (%) in 0° C. Tan δ>>

When the first layer and the second layer are applied with the dynamic stimulus in a state where they are attached together, a rate of change in 0° C. tan δ of the rubber composition of the first layer before and after being applied with the dynamic stimulus is greater than −20% and less than 20% from the viewpoint of maintaining wet grip performance until the end period of abrasion. The rate of change is preferably greater than −14%, more preferably greater than −10%, further preferably greater than −8%, particularly preferably greater than −6%. Moreover, the rate of change is preferably less than 14%, more preferably less than 10%, further preferably less than 8%, further preferably less than 6%, further preferably less than 4%, particularly preferably less than 2%.

<<0° C. Tan δ>>

0° C. tan δ of the rubber composition of the first layer 2 is preferably 0.10 or more, more preferably 0.12 or more, further preferably 0.15 or more, particularly preferably 0.18 or more, from the viewpoint of wet grip performance. Moreover, 0° C. tan δ of the rubber composition of the second layer 3 is preferably 0.10 or more, more preferably 0.12 or more, further preferably 0.14 or more. On the other hand, 0° C. tan δ of the rubber composition of each of the first layer 2 and the second layer 3 is preferably 0.80 or less, more preferably 0.60 or less, further preferably 0.50 or less, further preferably 0.40 or less, particularly preferably 0.30 or less, from the viewpoint of fuel efficiency. Besides, a value of 0° C. tan δ of the rubber composition of the first layer 2 is preferably larger than a value of 0° C. tan δ of the rubber composition of the second layer 3. A difference between 0° C. tan δ of the rubber composition of the first layer 2 and 0° C. tan δ of the rubber composition of the second layer 3 is preferably 0.01 or more, more preferably 0.02 or more, further preferably 0.03 or more, particularly preferably 0.04 or more. Besides, 0° C. tan δ of the rubber composition can be appropriately adjusted depending on types and compounding amounts of a rubber component, a plasticizer, etc.

<<0° C. E*>>

0° C. E* of the rubber composition of the first layer 2 is preferably 4.0 MPa or more, more preferably 5.0 MPa or more, further preferably 6.0 MPa or more, particularly preferably 7.0 MPa or more, from the viewpoint of wet grip performance. Moreover, 0° C. E* of the rubber composition of the second layer 3 is preferably 4.0 MPa or more, more preferably 5.0 MPa or more, further preferably 6.0 MPa or more, further preferably 7.0 MPa or more, particularly preferably 8.0 MPa or more. On the other hand, 0° C. E* of the rubber composition of each of the first layer 2 and the second layer 3 is preferably 100 MPa or less, more preferably 70 MPa or less, further preferably MPa or less, particularly preferably 30 MPa or less, from the viewpoint of followability to a road surface. Besides, a value of 0° C. E* of the rubber composition of the first layer 2 is preferably smaller than a value of 0° C. E* of the rubber composition of the second layer 3. A difference between 0° C. E* of the rubber composition of the first layer 2 and 0° C. E* of the rubber composition of the second layer 3 is preferably 0.5 MPa or more, more preferably 1.0 MPa or more, further preferably 1.5 MPa or more. When 0° C. E* is set within the above-described ranges, a balance between followability to a road surface and an anchor friction is improved, so that it is considered that deterioration of wet grip performance after tire abrasion can be suppressed. Besides, 0° C. E* of the rubber composition can be appropriately adjusted depending on types and compounding amounts of a rubber component, a plasticizer, etc.

<<Glass Transition Temperature (Tg)>>

A Tg of the rubber composition of the first layer 2 is preferably −40° C. or higher, more preferably −35° C. or higher, further preferably −30° C. or higher, from the viewpoint of wet grip performance. When the Tg is −40° C. or higher, a loss tangent tan δ in a temperature range higher than the Tg tends to become higher compared with a case of lower than −40° C. Moreover, a Tg of the rubber composition of the second layer 3 is preferably −60° C. or higher, more preferably −55° C. or higher, further preferably −50° C. or higher, particularly preferably −45° C. or higher. Besides, an upper limit value of the Tg of the rubber composition of each of the first layer 2 and the second layer 3 is, but not particularly limited to, preferably 20° C. or lower, more preferably 10° C. or lower, further preferably 0° C. or lower, particularly preferably −10° C. or lower. Besides, the Tg of the rubber composition can be appropriately adjusted depending on types and compounding amounts of a rubber component, a plasticizer, etc.

<<Elongation at Break (EB)>>

An EB of the rubber composition of the first layer 2 is preferably 200% or more, more preferably 300% or more, further preferably 400% or more, particularly preferably 500% or more, from the viewpoint of abrasion resistance. Moreover, an EB of the rubber composition of the second layer 3 is preferably 200% or more, more preferably 300% or more, further preferably 400% or more, particularly preferably 450% or more. When the EB is set within above-described ranges, a surface condition of a tire at the time of abrasion becomes easy to be smoothly maintained, and a decrease in actual grounding area is suppressed, so that it is considered that, as a result, deterioration of wet grip performance after tire abrasion can be suppressed. Besides, an upper limit value of the EB of the rubber composition of each of the first layer 2 and the second layer 3 is not particularly limited. Besides, the EB of the rubber composition can be appropriately adjusted depending on types and compounding amounts of a rubber component, a plasticizer, etc.

$(AE_1-AE_2)/(t2/t1)$ is preferably 22.0 or more, more preferably 24.0 or more, further preferably 27.0 or more, further preferably 30.0 or more, particularly preferably 33.0 or more, from the viewpoint of the effects of the present invention. On the other hand, an upper limit value of $(AE_1-AE_2)/(t2/t1)$ is, but not particularly limited to, preferably 100 or less, more preferably 90.0 or less, further preferably 80.0 or less, particularly preferably 70.0 or less.

[Rubber Composition for Tread]

The tread part of the present embodiment comprises at least a first layer 2 constituting a tread surface and a second layer 3 adjacent to an inner side of the first layer 2 in a radial direction, characterized in that a difference between an acetone extraction amount of a rubber composition of the first layer 2 and an acetone extraction amount of a rubber composition of the second layer 3 is within a predetermined range. The rubber composition of each layer of the tread part can be produced by using raw materials which will be described below according to a required acetone extraction amount or the like. The followings are detailed descriptions.

<Rubber Component>

In the rubber composition according to the present embodiment, a diene-based rubber is appropriately used as a rubber component. Examples of the diene-based rubber include, for example, an isoprene-based rubber, a butadiene rubber (BR), a styrene-butadiene rubber (SBR), a styrene-isoprene rubber (SIR), a styrene-isoprene-butadiene rubber (SIBR), a chloroprene rubber (CR), an acrylonitrile-butadiene rubber (NBR), and the like. These rubber components may be used alone, or two or more thereof may be used in combination.

A content of the diene-based rubber in 100% by mass of the rubber component is preferably 70% by mass or more, more preferably 80% by mass or more, further preferably 90% by mass or more, particularly preferably 95% by mass or more. Moreover, the rubber component may be one consisting of a diene-based rubber.

The rubber composition according to the present embodiment preferably comprises at least one selected from a group consisting of an isoprene-based rubber, a styrene-butadiene rubber (SBR), and a butadiene rubber (BR), as rubber components. The rubber component of each of the first layer 2 and the second layer 3 preferably comprises an isoprene-based rubber, more preferably comprises an isoprene-based rubber and a BR, further preferably comprises an isoprene-based rubber, a BR, and a SBR, and may be a rubber component consisting of an isoprene-based rubber, a BR, and a SBR.

(Isoprene-Based Rubber)

As an isoprene-based rubber, for example, those common in the tire industry can be used, such as an isoprene rubber (IR), a natural rubber, and the like. Examples of the natural rubber include a non-modified natural rubber (NR), as well as a modified natural rubber such as an epoxidized natural rubber (ENR), a hydrogenated natural rubber (HNR), a deproteinized natural rubber (DPNR), an ultra pure natural rubber, a grafted natural rubber, and the like. These isoprene-based rubbers may be used alone, or two or more thereof may be used in combination.

The NR is not particularly limited, and those common in the tire industry can be used, examples of which include, for example, SIR20, RSS #3, TSR20, and the like.

A content of the isoprene-based rubber when compounded in 100% by mass of the rubber component is preferably 80% by mass or less, more preferably 75% by mass or less, further preferably 70% by mass or less, particularly preferably 65% by mass or less, from the viewpoint of wet grip performance. Moreover, a lower limit value of the content of the isoprene-based rubber when compounded is, but not particularly limited to, preferably 10% by mass or more, more preferably 20% by mass or more, further preferably 30% by mass or more, further preferably 40% by mass or more, particularly preferably 50% by mass or more.

(SBR)

The SBR is not particularly limited, examples of which include unmodified solution-polymerized SBR (S-SBR) and unmodified emulsion-polymerized SBR (E-SBR), modified SBRs (a modified S-SBR, a modified E-SBR) thereof, and the like. Examples of the modified SBR include a SBR modified at its terminal and/or main chain, a modified SBR coupled with tin, a silicon compound, etc. (a modified SBR of condensate or having a branched structure, etc.), and the like. Among them, the S-SBR and the modified SBR are preferable. Furthermore, hydrogenated ones of these SBRs (hydrogenated SBRs) and the like can also be used. These SBRs may be used alone, or two or more thereof may be used in combination.

As the SBR, an oil-extended SBR can be used, or a non-oil-extended SBR can be used. An extending oil amount of the SBR, i.e., a content of an extending oil contained in the SBR when used is preferably 10 parts by mass or more and 50 parts by mass or less based on 100 parts by mass of a rubber solid content of the SBR.

As S-SBRs that can be used in the present embodiment, those commercially available from JSR Corporation, Sumitomo Chemical Co., Ltd., Ube Industries, Ltd., Asahi Kasei Corporation, ZS Elastomer Co., Ltd., etc. can be used.

A styrene content of the SBR is preferably 10% by mass or more, more preferably 15% by mass or more, further preferably 20% by mass or more, from the viewpoints of wet grip performance and abrasion resistance. Moreover, it is preferably 60% by mass or less, more preferably 55% by mass or less, further preferably 50% by mass or less, from the viewpoints of temperature dependence of grip performance and blow resistance. Besides, the styrene content of the SBR is measured by the above-described measuring method.

A vinyl content of the SBR is preferably 10 mol % or more, more preferably 15 mol % or more, further preferably 20 mol % or more, from the viewpoints of ensuring reactivity with silica, wet grip performance, rubber strength, and abrasion resistance. Moreover, the vinyl content of the SBR is preferably 80 mol % or less, more preferably 70 mol % or less, further preferably 65 mol % or less, from the viewpoints of prevention of increase in temperature dependence, elongation at break, and abrasion resistance. Besides, the vinyl content of the SBR is measured by the above-described measuring method.

A weight-average molecular weight (Mw) of the SBR is preferably 200,000 or more, more preferably 250,000 or more, further preferably 300,000 or more, from the viewpoint of wet grip performance. Moreover, the Mw of the SBR is preferably 2,000,000 or less, more preferably 1,800,000 or less, further preferably 1,500,000 or less, from the viewpoint of cross-linking uniformity. Besides, the Mw of the SBR is measured by the above-described measuring method.

A content of the SBR when compounded in 100% by mass of the rubber component is preferably 1% by mass or more, more preferably 5% by mass or more, further preferably 8% by mass or more, particularly preferably 10% by mass or more, from the viewpoint of wet grip performance. Moreover, the content of the SBR in the rubber component is preferably 60% by mass or less, more preferably 50% by mass or less, further preferably 40% by mass or less, further preferably 30% by mass or less, particularly preferably 20% by mass or less.

(BR)

The BR is not particularly limited, and those common in the tire industry can be used such as, for example, a BR having a cis content of less than 50 mol % (a low cis BR), a BR having a cis content of 90 mol % or more (a high cis BR), a rare-earth-based butadiene rubber synthesized using a rare-earth element-based catalyst (a rare-earth-based BR), a BR containing a syndiotactic polybutadiene crystal (a SPB-containing BR), a modified BR (a high cis modified BR, a low cis modified BR), and the like. Examples of the modified BR include BRs modified with similar functional groups and the like as explained in the above-described SBR. These BRs may be used alone, or two or more thereof may be used in combination.

As the high cis BR, for example, those commercially available from Zeon Corporation, Ube Industries, Ltd., JSR Corporation, etc. can be used. When the high cis BR is compounded, low temperature characteristics and abrasion resistance can be improved. The cis content of the high cis BR is preferably 95 mol % or more, more preferably 96 mol % or more, further preferably 97 mol % or more, particularly preferably 98 mol % or more.

As the rare-earth-based BR, those which are synthesized using a rare-earth element-based catalyst, and have a vinyl content of preferably 1.8 mol % or less, more preferably 1.0 mol % or less, further preferably 0.8% mol or less and a cis content of preferably 95 mol % or more, more preferably 96 mol % or more, further preferably 97 mol % or more, particularly preferably 98 mol % or more, can be used. As the rare-earth-based BR, for example, those commercially available from LANXESS, etc. can be used. Besides, the vinyl content and the cis content of the BR are measured by the above-described measuring method.

Examples of the SPB-containing BR include those in which 1,2-syndiotactic polybutadiene crystal is chemically bonded with BR and dispersed, but not those in which the crystal is simply dispersed in the BR. As such a SPB-containing BR, those commercially available from Ube Industries, Ltd., etc. can be used.

As a modified BR, a modified butadiene rubber (a modified BR) modified at its terminal and/or main chain with a functional group comprising at least one element selected from a group consisting of silicon, nitrogen, and oxygen can be appropriately used.

Examples of other modified BRs include those obtained by adding a tin compound after polymerizing 1,3-butadiene by a lithium initiator, the end of which is further bonded by tin-carbon bond (a tin-modified BR), and the like. Moreover, the modified BR may be either non-hydrogenated or hydrogenated.

The BRs listed above may be used alone, or two or more thereof may be used in combination.

A weight-average molecular weight (Mw) of the BR is preferably 300,000 or more, more preferably 350,000 or more, further preferably 400,000 or more, from the viewpoint of abrasion resistance. Moreover, it is preferably 2,000,000 or less, more preferably 1,000,000 or less, from the viewpoint of cross-linking uniformity. Besides, the Mw of the BR is measured by the above-described measuring method.

A content of the BR when compounded in 100% by mass of the rubber component is preferably 60% by mass or less, more preferably 50% by mass or less, further preferably 40% by mass or less, particularly preferably 35% by mass or less, from the viewpoint of wet grip performance. Moreover, the content of the BR when compounded is preferably 5% by mass or more, more preferably 10% by mass or more, further preferably 15% by mass or more, particularly preferably 20% by mass or more.

(Other Rubber Components)

The rubber component may comprise rubber components other than diene-based rubbers as long as they do not affect the effects of the present invention. As other rubber components other than diene-based rubbers, cross-linkable rubber components commonly used in the tire industry can be used, examples of which include, for example, a butyl rubber (IIR), a halogenated butyl rubber, an ethylene-propylene rubber, a polynorbornene rubber, a silicone rubber, a polyethylene chloride rubber, a fluorine rubber (FKM), an acrylic rubber (ACM), a hydrin rubber, and the like. These other rubber components may be used alone, or two or more thereof may be used in combination. Moreover, besides the above-described rubber components, the rubber component may or may not comprise a known thermoplastic elastomer.

<Plasticizer>

The rubber composition according to the present embodiment comprises a plasticizer. The plasticizer is a material that imparts plasticity to the rubber component, and has a concept that includes a liquid plasticizer (a plasticizer that is a liquid (in a liquid state) at a normal temperature (25° C.) and a solid plasticizer (a plasticizer that is a solid (in a solid state) at a normal temperature (25° C.)). Specifically, it is a component as extracted from the rubber composition using acetone. The plasticizer may be used alone, or two or more thereof may be used in combination.

The plasticizers according to the present embodiment are classified into a plasticizer A, a plasticizer B, a plasticizer C, and other plasticizers, depending on a velocity at which the plasticizer diffuses from the first layer to the second layer, by an evaluation method on a diffusion velocity of each of the plasticizers in the reference Examples as described above and below. The plasticizer A having a higher diffusion velocity preferably has a glass transition point of −40° C. or lower and/or a weight-average molecular weight (Mw) of less than 1,000. The plasticizer B having a moderate diffusion velocity preferably has a glass transition point of 30° C. or higher. The plasticizer C having a slower diffusion velocity preferably has a glass transition point of higher than −70° C. and lower than 30° C. and/or a weight-average molecular weight (Mw) of 1000 or more.

The plasticizer A is preferably at least one of oil and an ester-based plasticizer. The plasticizer B is preferably a resin component. The plasticizer C is preferably a liquid polymer.

The rubber composition according to the present embodiment preferably comprises a plasticizer A and a plasticizer B and/or a plasticizer C, and more preferably comprises a plasticizer A, a plasticizer B, and a plasticizer C.

Examples of the resin component include, but not particularly limited to, a petroleum resin, a terpene-based resin, a rosin-based resin, a phenol resin-based, and the like, which are commonly used in the tire industry. Among them, a terpene-based resin is appropriately used. As the resin component, for example, one having a glass transition point of 30° C. or higher is appropriately selected. These resin components may be used alone, or two or more thereof may be used in combination.

Examples of the petroleum resin include a C5-based petroleum resin, an aromatic petroleum resin, a C5-C9-based petroleum resin, and the like.

In the present specification, the "C5-based petroleum resin" refers to a resin obtained by polymerizing C5 fractions, and may be one obtained by hydrogenating or modifying them. Examples of the C5 fraction include, for example, a petroleum fraction having 4 to 5 carbon atoms such as cyclopentadiene, a pentene, a pentadiene, isoprene, and the like. As the C5-based petroleum resin, a dicyclopentadiene resin (DCPD resin) is appropriately used.

In the present specification, an "aromatic petroleum resin" refers to a resin obtained by polymerizing C9 fractions, and may be one obtained by hydrogenating or modifying them. Examples of the C9 fraction include, for example, a petroleum fraction having 8 to 10 carbon atoms such as vinyltoluene, an alkylstyrene, indene, a methyl indene, and the like. As specific examples of the aromatic petroleum resin, for example, a coumarone indene resin, a coumarone resin, an indene resin, and an aromatic vinyl-based resin are appropriately used. As the aromatic vinyl-based resin, a homopolymer of α-methylstyrene or styrene or a copolymer of α-methylstyrene and styrene is preferable, and a copolymer of α-methylstyrene and styrene is more preferable, because it is economical, easy to process, and excellent in heat generation. As the aromatic vinyl-based resin, for example, those commercially available from Kraton Corporation, Eastman Chemical Company, etc. can be used.

In the present specification, the "C5-C9-based petroleum resin" refers to a resin obtained by copolymerizing the C5 fraction and the C9 fraction, and may be one obtained by hydrogenating or modifying them. Examples of the C5 fraction and the C9 fraction include the above-described petroleum fractions. As the C5-C9-based petroleum resin, for example, those commercially available from Tosoh Corporation, Zibo Luhua Hongjin New Material Group Co., Ltd, etc. can be appropriately used.

Examples of the terpene-based resin include a polyterpene resin consisting of at least one selected from terpene compounds such as α-pinene, β-pinene, limonene, a dipentene, and the like; an aromatic-modified terpene resin made from a terpene compound and an aromatic compound; a terpene phenolic resin made from a terpene compound and a phenol-based compound; and those in which these terpene-based resins are hydrogenated (hydrogenated terpene-based resins). Examples of the aromatic compound used as a raw material for the aromatic-modified terpene resin include, for example, styrene, α-methylstyrene, vinyltoluene, a divinyltoluene, and the like. Examples of the phenol-based compound used as a raw material for the terpene phenolic resin include, for example, phenol, bisphenol A, cresol, xylenol, and the like.

Example of the rosin-based resin include, but not particularly limited to, for example, a natural resin rosin and a rosin-modified resin obtained by modifying it by hydrogenation, disproportionation, dimerization, esterification, or the like.

Examples of the phenol-based resin include, but not particularly limited to, a phenol formaldehyde resin, an alkylphenol formaldehyde resin, an alkylphenol acetylene resin, an oil-modified phenol formaldehyde resin, and the like.

A glass transition point (Tg) of the resin component is preferably 30° C. or higher, more preferably 40° C. or lower, further preferably 50° C. or higher, particularly preferably 60° C. or higher. Moreover, the Tg of the resin component is preferably 140° C. or lower, more preferably 120° C. or lower, further preferably 100° C. or lower, particularly preferably 80° C. or lower.

A content of the resin component based on 100 parts by mass of the rubber component of the rubber composition of the first layer 2 is preferably 1.0 parts by mass or more, more preferably 3.0 parts by mass or more, more preferably 5.0 parts by mass or more, further preferably 7.0 parts by mass or more, further preferably 8.0 parts by mass or more, further preferably 10 parts by mass or more, particularly preferably 12 parts by mass or more, from the viewpoint of wet grip performance. Moreover, the content is preferably 60 parts by mass or less, more preferably 50 parts by mass or less, further preferably 40 parts by mass or less, further preferably 30 parts by mass or less, particularly preferably 25 parts by mass or less, from the viewpoint of suppressing heat generation. Besides, the content of the resin component based on 100 parts by mass of the rubber component of the rubber composition of the second layer 3 is not particularly limited.

Examples of oil include, for example, a process oil, vegetable fats and oils, animal fats and oils, and the like. Examples of the process oil include a paraffin-based process oil (mineral oil), a naphthene-based process oil, an aroma-based process oil, and the like. Specific examples of the process oil include, for example, MES (Mild Extract Solvated), DAE (Distillate Aromatic Extract), TDAE (Treated Distillate Aromatic Extract), TRAE (Treated Residual Aromatic Extract), RAE (Residual al Aromatic Extract), and the like. Moreover, as an environmental measure, process oil having a low content of a polycyclic aromatic compound (PCA) can also be used. Examples of the process oil having a low content of a PCA content include MES, TDAE, a heavy naphthenic oil, and the like. In addition, from the viewpoint of life cycle assessment, those obtained by purifying a waste oil after being used in a rubber mixer or an engine, or a waste cooking oil used in a restaurant may be used.

A glass transition point (Tg) of the oil is preferably −40° C. or lower, more preferably −50° C. or lower. Moreover, the Tg of the oil is preferably −100° C. or higher, more preferably −80° C. or higher.

A weight-average molecular weight (Mw) of the oil is preferably less than 1000, preferably less than 800, further preferably less than 700, particularly preferably less than 600. Moreover, the Mw of the oil is preferably greater than 100, more preferably greater than 200, further preferably greater than 300.

A content of oil when compounded based on 100 parts by mass of the rubber component is preferably 1.0 parts by mass or more, more preferably 3.0 parts by mass or more, further preferably 5.0 parts by mass or more, particularly preferably 7.0 parts by mass or more, from the viewpoint of processability. Moreover, it is preferably 120 parts by mass or less, more preferably 100 parts by mass or less, further preferably 80 parts by mass or less, further preferably 60 parts by mass or less, further preferably 50 parts by mass or less, further preferably 40 parts by mass or less, further preferably 30 parts by mass or less, particularly preferably 25 parts by mass or less, from the viewpoint of abrasion resistance.

The liquid polymer is not particularly limited as long as it is a polymer in a liquid state at a normal temperature (25° C.), examples of which include, for example, a liquid butadiene rubber (a liquid BR), a liquid styrene-butadiene rubber (a liquid SBR), a liquid isoprene rubber (a liquid IR), a liquid styrene-isoprene rubber (a liquid SIR), a liquid farnesene rubber, and the like. Among them, a liquid BR and/or a liquid SBR are appropriately used. These liquid polymers may be used alone, or two or more thereof may be used in combination.

A glass transition point (Tg) of the liquid polymer is preferably higher than −70° C., more preferably higher than −50° C., further preferably higher than −30° C. Moreover, the Tg of the liquid polymer is preferably lower than 30° C., more preferably lower than 20° C., further preferably lower than 10° C., particularly preferably lower than 0° C.

A weight-average molecular weight (Mw) of the liquid polymer is preferably 1,000 or more, more preferably 2,000 or more, further preferably 3,000 or more, further preferably 3,500 or more, particularly preferably 4,000 or more. Moreover, the Mw of the liquid polymer is preferably 30,000 or less, more preferably 10,000 or less, further preferably 8,000 or less, particularly preferably 6,000 or less.

A content of the liquid polymer based on 100 parts by mass of the rubber component of the rubber composition of the first layer 2 is preferably 1.0 parts by mass or more, more preferably 3.0 parts by mass or more, further preferably 5.0 parts by mass or more, particularly preferably 7.0 parts by mass or more. Moreover, the content of the liquid polymers is preferably 50 parts by mass or less, more preferably 40 parts by mass or less, further preferably 30 parts by mass or less, particularly preferably 20 parts by mass or less. Besides, a content of the liquid polymer based on 100 parts by mass of the rubber component of the rubber composition of the second layer 3 is not particularly limited.

Examples of the ester-based plasticizer include, for example, dibutyl adipate (DBA), diisobutyl adipate (DIBA), dioctyl adipate (DOA), bis(2-ethylhexyl) azelate (DOZ), dibutyl sebacate (DBS), diisononyl adipate (DINA), diethyl phthalate (DEP), dioctyl phthalate (DOP), diundecyl phthalate (DUP), dibutyl phthalate (DBP), dioctyl sebacate (DOS), tributyl phosphate (TBP), trioctyl phosphate (TOP), triethyl phosphate (TEP), trimethyl phosphate (TMP), thymidine triphosphate (TTP), tricresyl phosphate (TCP), trixylenyl phosphate (TXP), and the like. These ester-based plasticizers may be used alone, or two or more thereof may be used in combination.

A glass transition point (Tg) of the ester-based plasticizer is preferably −40° C. or lower, more preferably −50° C. or lower. Moreover, the Tg of the ester-based plasticizer is preferably −100° C. or higher, more preferably −80° C. or higher.

A weight-average molecular weight (Mw) of the ester-based plasticizer is preferably less than 1000, preferably less than 800, further preferably less than 700, particularly preferably less than 600. Moreover, the Mw of the ester-based plasticizer is preferably greater than 100, more preferably greater than 200, further preferably greater than 300.

A content of the ester-based plasticizer based on 100 parts by mass of the rubber component of the rubber composition of the first layer 2 is preferably 1.0 parts by mass or more, more preferably 3.0 parts by mass or more, further preferably 5.0 parts by mass or more, particularly preferably 7.0 parts by mass or more. Moreover, it is preferably 120 parts by mass or less, more preferably 100 parts by mass or less, further preferably 80 parts by mass or less, further preferably 60 parts by mass or less, further preferably 50 parts by mass or less, further preferably 40 parts by mass or less, further preferably parts by mass or less, particularly preferably 25 parts by mass or less, from the viewpoint of abrasion resistance. Besides, a content of the ester-based plasticizer based on 100 parts by mass of the rubber component of the rubber composition of the second layer 3 is not particularly limited.

A ratio of the content of the liquid polymer to the oil in the plasticizer contained in the rubber composition of the first layer 2 is preferably greater than 0.10, preferably greater than 0.15, more preferably greater than 0.20, further preferably greater than 0.25, particularly preferably greater than 0.30. Moreover, the ratio of the content is preferably less than 10, more preferably less than 5.0, further preferably less than 3.0, further preferably less than 2.5, further preferably less than 2.0, further preferably less than 1.6, particularly preferably less than 1.2.

A ratio of the content of the resin component to the oil in the plasticizer contained in the rubber composition of the first layer 2 is preferably greater than 0.10, preferably greater than 0.15, more preferably greater than 0.20, further preferably greater than 0.25, particularly preferably greater than 0.30. Moreover, the ratio of the content is preferably less than 10, more preferably less than 5.0, further preferably less than 3.0, further preferably less than 2.5, further preferably less than 2.0, particularly preferably less than 1.6.

A content of the plasticizer A based on 100 parts by mass of the rubber component of the rubber composition of each of the first layer 2 and the second layer 3 (a total amount of all of a plurality of plasticizers when used in combination) is preferably 3.0 parts by mass or more, more preferably 5.0 parts by mass or more, further preferably 7.0 parts by mass or more, further preferably 8.0 parts by mass or more, further preferably 10 parts by mass or more, particularly preferably 12 parts by mass or more. Moreover, the content of the plasticizer A based on 100 parts by mass of the rubber component of the rubber composition of each of the first layer 2 and the second layer 3 is preferably 120 parts by mass or less, more preferably 100 parts by mass or less, further preferably 80 parts by mass or less, further preferably 60 parts by mass or less, further preferably 50 parts by mass or less, further preferably 40 parts by mass or less, further preferably 30 parts by mass or less, particularly preferably 25 parts by mass or less.

A content of the plasticizer B based on 100 parts by mass of the rubber component of the rubber composition of the first layer 2 (a total amount of all of a plurality of plasticizers when used in combination) is preferably 1.0 parts by mass or more, more preferably 3.0 parts by mass or more, further preferably 5.0 parts by mass or more, further preferably 7.0 parts by mass or more, further preferably 8.0 parts by mass or more, further preferably 10 parts by mass or more, particularly preferably 12 parts by mass or more. Moreover, the content of the plasticizer B based on 100 parts by mass of the rubber component of the rubber composition of the first layer 2 is preferably 60 parts by mass or less, more preferably 50 parts by mass or less, further preferably parts by mass or less, further preferably 30 parts by mass or less, particularly preferably 25 parts by mass or less. Besides, a content of the plasticizer B based on 100 parts by mass of the rubber component of the rubber composition of the second layer 3 is not particularly limited.

A content of the plasticizer C based on 100 parts by mass of the rubber component of the rubber composition of the first layer 2 (a total amount of all of a plurality of plasticizers when used in combination) is preferably 1.0 parts by mass or more, more preferably 3.0 parts by mass or more, further preferably 5.0 parts by mass or more, particularly preferably 7.0 parts by mass or more. Moreover, the content of the plasticizer C based on 100 parts by mass of the rubber component of the rubber composition of the first layer 2 is preferably 50 parts by mass or less, more preferably 40 parts by mass or less, further preferably 30 parts by mass or less, particularly preferably 20 parts by mass or less. Besides, a content of the plasticizer C based on 100 parts by mass of the rubber component of the rubber composition of the second layer 3 is not particularly limited.

A content of other plasticizers based on 100 parts by mass of the rubber component of the rubber composition of each of the first layer 2 and the second layer 3 (a total amount of all of a plurality of plasticizers when used in combination) is preferably 20 parts by mass or less, more preferably 10 parts by mass or less, further preferably 5 parts by mass or less, particularly preferably 1 part by mass or less, and the rubber composition may not comprise other plasticizers.

A difference between the content of the plasticizer in the rubber composition of the first layer 2 and the content of the plasticizer in the rubber composition of the second layer 3 based on 100 parts by mass of the rubber component is preferably 10 parts by mass or more, more preferably 15 parts by mass or more, further preferably 20 parts by mass or more, particularly preferably 25 parts by mass or more. It is considered that, when the difference between the compounding amount of the plasticizer in the rubber composition of the first layer 2 and the compounding amount of the plasticizer in the rubber composition of the second layer 3 is set within the above-described ranges, hardening of the first layer 2 over time can be suppressed. Besides, an upper limit value of the difference between the compounding amount of the plasticizer in the rubber composition of the first layer 2 and the compounding amount of the plasticizer in the rubber composition of the second layer 3 is not particularly limited from the viewpoint of the effects of the present invention, but it can be, for example, 80% by mass or less, 70% by mass or less, 60% by mass or less, 50% by mass or less, or 40% by mass or less.

<Filler>

For the rubber composition according to the present embodiment, a filler comprising carbon black and/or silica is appropriately used. The rubber composition of each of the first layer 2 and the second layer 3 more preferably comprise silica as a filler, and more preferably comprise carbon black and silica.

(Carbon Black)

As carbon black, those common in the tire industry can be appropriately used, examples of which include, for example, GPF, FEF, HAF, ISAF, SAF, and the like. These carbon black may be used alone, or two or more thereof may be used in combination.

A nitrogen adsorption specific surface area ($N_2SA$) of carbon black is preferably 10 $m^2/g$ or more, more preferably 20 $m^2/g$ or more, further preferably 35 $m^2/g$ or more, particularly preferably 50 $m^2/g$ or more, from the viewpoint of reinforcing property. Moreover, it is preferably 200 $m^2/g$ or less, more preferably 160 $m^2/g$ or less, further preferably 140 $m^2/g$ or less, from the viewpoints of fuel efficiency and processability. Besides, the $N_2SA$ of carbon black is measured by the above-described measuring method.

An oil absorption amount (DBP oil absorption amount (OAN)) of carbon black is preferably 80 mL/100 g or more, more preferably 90 mL/100 g or more, further preferably 100 mL/100 g or more, from the viewpoint of reinforcing property. Moreover, the OAN is preferably 250 mL/100 g or less, more preferably 200 mL/100 g or less, further preferably 160 mL/100 g or less, from the viewpoint of processability. Besides, the OAN of carbon black is measured by the above-described measuring method.

A content of carbon black when compounded based on 100 parts by mass of the rubber component is preferably 5 parts by mass or more, more preferably 10 parts by mass or more, further preferably 15 parts by mass or more, particularly preferably 20 parts by mass or more, from the viewpoints of abrasion resistance and wet grip performance. Moreover, it is preferably 100 parts by mass or less, more preferably 80 parts by mass or less, further preferably 60 parts by mass or less, further preferably 50 parts by mass or less, particularly preferably 40 parts by mass or less, from the viewpoint of fuel efficiency.

(Silica)

Silica is not particularly limited, and those common in the tire industry can be used, such as, for example, silica prepared by a dry process (anhydrous silica), silica prepared by a wet process (hydrous silica), and the like. Among them, hydrous silica prepared by a wet process is preferable from the reason that it has many silanol groups. These silica may be used alone, or two or more thereof may be used in combination.

A nitrogen adsorption specific surface area ($N_2SA$) of silica is preferably 100 $m^2/g$ or more, more preferably 120 $m^2/g$ or more, further preferably 140 $m^2/g$ or more, particularly preferably 160 $m^2/g$ or more, from the viewpoints of fuel efficiency and abrasion resistance. Moreover, it is preferably 350 $m^2/g$ or less, more preferably 300 $m^2/g$ or less, further preferably 250 $m^2/g$ or less, from the viewpoints of fuel efficiency and processability. Besides, the $N_2SA$ of silica is measured by the above-described measuring method.

A content of silica when compounded based on 100 parts by mass of the rubber component is preferably 20 parts by mass or more, more preferably 30 parts by mass or more, further preferably 40 parts by mass or more, particularly preferably 50 parts by mass or more, from the viewpoint of wet grip performance. Moreover, it is preferably 130 parts by mass or less, more preferably 110 parts by mass or less, further preferably 100 parts by mass or less, particularly preferably 90 parts by mass or less, from the viewpoint of abrasion resistance.

A total content of silica and carbon black based on 100 parts by mass of the rubber component is preferably 25 parts by mass or more, more preferably 40 parts by mass or more, further preferably 55 parts by mass or more, particularly preferably 70 parts by mass or more, from the viewpoint of abrasion resistance. Moreover, it is preferably 160 parts by mass or less, more preferably 140 parts by mass or less, further preferably 120 parts by mass or less, from the viewpoints of fuel efficiency and elongation at break.

In the rubber composition of each of the first layer 2 and the second layer 3, it is preferable that the content of silica based on 100 parts by mass of the rubber component is larger than that of carbon black from the viewpoint of a balance of fuel efficiency, wet grip performance, and abrasion resistance. A ratio of a content of silica to a total content of silica and carbon black in the first layer 2 and the second layer 3 is preferably 50% by mass or more, more preferably 55% by mass or more, further preferably 60% by mass or more, particularly preferably 65% by mass or more.

(Silane Coupling Agent)

Silica is preferably used in combination with a silane coupling agent. The silane coupling agent is not particularly limited, and any silane coupling agent conventionally used in combination with silica in the tire industry can be used, examples of which include, for example, mercapto-based silane coupling agents such as 3-mercaptopropyltrimethoxysilane, 3-mercaptopropyltriethoxysilane, 2-mercaptoethyltrimethoxysilane, 2-mercaptoethyltriethoxysilane, and the like; sulfide-based silane coupling agents such as bis(3-triethoxysilylpropyl)disulfide, bis(3-trethoxysilylpropyl)tetrasulfide, and the like; thioester-based silane coupling agents such as 3-octanoylthio-1-propyltriethoxysilane, 3-hexanoylthio-1-propyltriethoxysilane, 3-octanoylthio-1-propylt-rimethoxysilane, and the like; vinyl-based silane coupling agents such as vinyltriethoxysilane, vinyltrimethoxysilane, and the like; amino-based silane coupling agents such as 3-aminopropyltriethoxysilane, 3-aminopropyltrimethoxysilane, 3-(2-aminoethyl)aminopropyltriethoxysilane, and the like; glycydoxy-based silane coupling agents such as γ-glycidoxypropyltiethoxysilane, γ-glycidoxypropyltrimethoxysilane, and the like; nitro-based silane coupling agents such as 3-nitropropyltrimethoxysilane, 3-nitropropyltriethoxysilane, and the like; chloro-based silane coupling agents such as 3-chloropropyltrimethoxysilane, 3-chloropropyltriethoxysilane, and the like; and the like. Among them, sulfide-based silane coupling agents and/or mercapto-based silane coupling agents are preferably compounded. As the silane coupling agent, for example, those commercially available from Momentive Performance Materials, etc. can be used. These silane coupling agents may be used alone, or two or more thereof may be used in combination.

A total content of silane coupling agents when compounded based on 100 parts by mass of the rubber component is preferably 0.5 parts by mass or more, more preferably 1.0 parts by mass or more, further preferably 2.0 parts by mass or more, particularly preferably 3.0 parts by mass or more, from the viewpoint of enhancing dispersibility of silica. Moreover, it is preferably 20 parts by mass or less, more preferably 15 parts by mass or less, further preferably 12 parts by mass or less, particularly preferably 9.0 parts by mass or less, from the viewpoint of preventing deterioration of abrasion resistance.

A content of the silane coupling agent based on 100 parts by mass of silica is preferably 1.0 parts by mass or more, more preferably 3.0 parts by mass or more, further preferably 5.0 parts by mass or more, from the viewpoint of enhancing dispersibility of silica. Moreover, it is preferably 20 parts by mass or less, more preferably 15 parts by mass or less, further preferably 12 parts by mass or less, from the viewpoints of cost and processability.

As fillers, other fillers may further be used in addition to carbon black and silica. Such filler is not particularly limited, and any filler commonly used in this field such as, for example, aluminum hydroxide, alumina (aluminum oxide), calcium carbonate, magnesium sulfate, talc, clay, and the like can be used. These other fillers may be used alone, or two or more thereof may be used in combination.

(Other Compounding Agents)

The rubber composition according to the present embodiment can appropriately comprise compounding agents conventionally and generally used in the tire industry, for example, wax, processing aid, stearic acid, zinc oxide, an antioxidant, a vulcanizing agent, a vulcanization accelerator, and the like, in addition to the above-described components.

A content of wax when compounded based on 100 parts by mass of the rubber component is preferably 0.5 parts by mass or more, more preferably 1 part by mass or more, from the viewpoint of weather resistance of a rubber. Moreover, it is preferably 10 parts by mass or less, more preferably parts by mass or less, from the viewpoint of preventing whitening of a tire due to bloom.

Examples of processing aid include, for example, a fatty acid metal salt, a fatty acid amide, an amide ester, a silica surface active agent, a fatty acid ester, a mixture of a fatty acid metal salt and an amide ester, a mixture of a fatty acid metal salt and a fatty acid amide, and the like. These processing aid may be used alone, or two or more thereof may be used in combination. As processing aid, for example, those commercially available from Schill+Seilacher GmbH, Performance Additives, etc. can be used.

A content of processing aid when compounded based on 100 parts by mass of the rubber component is preferably 0.5 parts by mass or more, more preferably 1 part by mass or more, from the viewpoint of exhibiting an effect of improving processability. Moreover, it is preferably 10 parts by mass or less, more preferably 8 parts by mass or less, from the viewpoints of abrasion resistance and breaking strength.

Examples of the antioxidant include, but not particularly limited to, for example, amine-based, quinoline-based, quinone-based, phenol-based and imidazole-based compounds, and a carbamic acid metal salt, preferably, phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, and the like, and quinoline-based antioxidants such as 2,2,4-trimethyl-1,2-dihydroquinoline polymer, 6-ethoxy-2,2,4-trimethyl-1,2-dihydroquinoline, and the like. These antioxidants may be used alone, or two or more thereof may be used in combination.

A content of the antioxidant when compounded based on 100 parts by mass of the rubber component is preferably 0.5 parts by mass or more, more preferably 1 part by mass or more, from the viewpoint of ozone crack resistance of a rubber. Moreover, it is preferably 10 parts by mass or less, more preferably 5 parts by mass or less, from the viewpoints of abrasion resistance and wet grip performance.

A content of stearic acid when compounded based on 100 parts by mass of the rubber component is preferably 0.5 parts by mass or more, more preferably 1 part by mass or more, from the viewpoint of processability. Moreover, it is preferably 10 parts by mass or less, more preferably 5 parts by mass or less, from the viewpoint of vulcanization rate.

A content of zinc oxide when compounded based on 100 parts by mass of the rubber component is preferably 0.5 parts by mass or more, more preferably 1 part by mass or more, from the viewpoint of processability. Moreover, it is preferably 10 parts by mass or less, more preferably 5 parts by mass or less, from the viewpoint of abrasion resistance.

Sulfur is appropriately used as a vulcanizing agent. As sulfur, a powdery sulfur, an oil processing sulfur, a precipitated sulfur, a colloidal sulfur, an insoluble sulfur, a highly dispersible sulfur, and the like can be used.

A content of sulfur when compounded as a vulcanizing agent based on 100 parts by mass of the rubber component is preferably 0.1 parts by mass or more, more preferably 0.3 parts by mass or more, further preferably 0.5 parts by mass or more, from the viewpoint of securing a sufficient vulcanization reaction. Moreover, it is preferably 5.0 parts by mass or less, more preferably 4.0 parts by mass or less, further preferably 3.0 parts by mass or less, from the viewpoint of preventing deterioration. Besides, a content of the vulcanizing agent when an oil-containing sulfur is used as the vulcanizing agent shall be a total content of pure sulfur comprised in the oil-containing sulfur.

Examples of vulcanizing agents other than sulfur include, for example, an alkylphenol-sulfur chloride condensate, sodium hexamethylene-1,6-bisthiosulfate dihydrate, 1,6-bis(N,N'-dibenzylthiocarbamoyldithio)hexane, and the like. As these vulcanizing agents other than sulfur, those commercially available from Taoka Chemical Co., Ltd., LANXESS, Flexsys, etc. can be used.

Examples of the vulcanization accelerator include, for example, sulfenamide-based, thiazole-based, thiuram-based, thiourea-based, guanidine-based, dithiocarbamic acid-based, aldehyde-amine-based or aldehyde-ammonia-based, imidazoline-based, and xantate-based vulcanization accelerators, and the like. These vulcanization accelerators may be used alone, or two or more thereof may be used in combination. Among them, one or more vulcanization accelerators selected from the group consisting of sulfenamide-based, guanidine-based, and thiazole-based vulcanization accelerators are preferable, and sulfenamide-based vulcanization accelerators are more preferable.

Examples of the sulfenamide-based vulcanization accelerator include, for example, N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), and the like. Among them, N-cyclohexyl-2-benzothiazolylsulfenamide (CBS) is preferable.

Examples of the guanidine-based vulcanization accelerator include, for example, 1,3-diphenylguanidine (DPG), 1,3-di-o-tolylguanidine, 1-o-tolylbiguanide, di-o-tolylguanidine salt of dicatecholborate, 1,3-di-o-cumenylguanidine, 1,3-di-o-biphenylguanidine, 1,3-di-o-cumenyl-2-propionylguanidine, and the like. Among them, 1,3-diphenylguanidine (DPG) is preferable.

Examples of the thiazole-based vulcanization accelerator include, for example, 2-mercaptobenzothiazole, a cyclohexylamine salt of 2-mercaptobenzothiazole, di-2-benzothiazolyl disulfide, and the like. Among them, 2-mercaptobenzothiazole is preferable.

A content of the vulcanization accelerator when compounded based on 100 parts by mass of the rubber component (a total amount of all of a plurality of vulcanization accelerators when used in combination) is preferably 1 part by mass or more, more preferably 2 parts by mass or more, further preferably 3 parts by mass or more. Moreover, the content of the vulcanization accelerator based on 100 parts by mass of the rubber component is preferably 8 parts by mass or less, more preferably 7 parts by mass or less, further preferably 6 parts by mass or less. When the content of the vulcanization accelerator is within the above-described ranges, breaking strength and elongation tend to be secured.

The rubber composition according to the present embodiment can be produced by a known method. For example, it can be produced by kneading each of the above-described components using a rubber kneading apparatus such as an open roll, a closed type kneader, and the like (Bunbury mixer, kneader, etc.).

The kneading step includes, for example, a base kneading step of kneading compounding agents and additives other than vulcanizing agents and vulcanization accelerators and a final kneading (F kneading) step of adding vulcanizing agents and vulcanization accelerators to the kneaded product obtained by the base kneading step and kneading them. Furthermore, the base kneading step can be divided into a plurality of steps, if desired.

A kneading condition is not particularly limited. Examples of kneading include, for example, in the base kneading step, a method of kneading at a discharge temperature of 150 to 170° C. for 3 to 10 minutes, and in the final kneading step, a method of kneading at 70 to 110° C. for 1 to 5 minutes. A vulcanization condition is not particularly limited. Examples of vulcanization include, for example, a method of vulcanizing at 150 to 200° C. for to 30 minutes.

The tire according to the present embodiment comprises a tread comprising a first layer 2 and a second layer 3, and may be a pneumatic tire or a non-pneumatic tire. Moreover, examples of the pneumatic tire include a tire for a passenger car, a tires for a truck/bus, a motorcycle tire, a high-performance tire, and the like, particularly, it is appropriately used as a tire for a passenger car. Besides, the high-performance tire in the present specification is a tire having a particularly excellent grip performance and is a concept including a racing tire used for a racing vehicle.

The tire comprising a tread comprising a first layer 2 and a second layer 3 can be manufactured by a usual method using the above-described rubber composition. That is, the tire can be manufactured by extruding unvulcanized rubber compositions, obtained by compounding each of the above-described components based on the rubber component as necessary, into shapes of the first layer 2 and the second layer 3 with an extruder equipped with a mouthpiece having a predetermined shape, attaching them together with other tire members on a tire forming machine, and molding them by a usual method, forming an unvulcanized tire, followed by heating and pressurizing this unvulcanized tire in a vulcanizing machine.

Example

Although the present invention will be described based on Examples, it is not limited to Examples.

Various chemicals used in Examples and Comparative examples are collectively shown below.

SBR: SBR produced according to Production example 1 below (styrene content: 25% by mass, vinyl content: 59 mol %, Mw: 250,000, non-oil extended)

BR: Ubepol BR (Registered Trademark) 150B manufactured by Ube Industries, Ltd. (vinyl content: 1.5 mol %, cis content: 97 mol %, Mw: 440,000)

NR: TSR20

Carbon black: Seast 6 manufactured by Tokai Carbon Co., Ltd. (DBP oil absorption amount: 114 mL/100 g, $N_2SA$: 119 m²/g)

Silica: Zeosil 1115MP manufactured by Solvay ($N_2SA$: 160 m²/g)

Silane coupling agent: Si75 manufactured by Evonik Degussa GmbH (bis(3-triethoxysilylpropyl)disulfide)

Plasticizer 1: PS-32 manufactured by Idemitsu Kosan Co., Ltd. (paraffin-based process oil, Tg: −86° C., Mw: 300)

Plasticizer 2: Process X-140 manufactured by ENEOS Corporation (aroma-based process oil, Tg: −41° C., Mw: 600)

Plasticizer 3: YS POLYSTER T80 manufactured by Yasuhara Chemical Co., Ltd. (terpene phenolic resin, Tg: 62° C., Mw: 1000)

Plasticizer 4: PX1150N manufactured by Yasuhara Chemical Co., Ltd. (non-hydrogenated polyterpene resin, Tg: 62° C., Mw: 3000)

Plasticizer 5: Liquid SBR produced according to the Production example 2 below (Tg: −25° C., Mw: 5000)

Plasticizer 6: Liquid SBR produced according to the Production example 3 below (Tg: −5° C., Mw: 5000)

Plasticizer 7: TOP manufactured by DAIHACHI CHEMICAL INDUSTRY CO., LTD. (tris(2-ethylhexyl)phosphate, Tg: −74° C., Mw: 435)

Stearic acid: Bead stearic acid "CAMELLIA" manufactured by NOF CORPORATION

Zinc oxide: Zinc oxide manufactured by Mitsui Mining & Smelting Co., Ltd.

Vulcanization accelerator 1: Nocceler CZ manufactured by Ouchi Shinko Chemical Industry Co., Ltd. (N-cyclohexyl-2-benzothiazolsulfenamide)

Vulcanization accelerator 2: Nocceler D manufactured by Ouchi Shinko Chemical Industry Co., Ltd. (DPG, 1,3-diphenylguanidine)

Sulfur: Powdered sulfur manufactured by Karuizawa Sulfur Co, Ltd.

Production Example 1: Production of SBR 600 mL of hexane, 75 g of 1,3-butadiene, 25 g of styrene, and 60 mL of tetrahydrofuran were charged into an autoclave reactor subjected to nitrogen purge and stirred at 40° C. After adding 0.1 mol/L of n-butyllithium/hexane solution in 0.5 mL each to scavenge them, 4 mL of 0.1 mol/L n-butyllithium/hexane solution was added, and the mixture was stirred at a stirring speed of 130 rpm and a jacket temperature at 80° C. After confirming production of a polymer having a Mw of 250,000 by GPC, a polymerization solution was poured into 4 L of ethanol to collect a precipitate. After blow-drying the obtained precipitate, it was dried under reduced pressure at 80° C./10 Pa or lower until a drying loss became 0.1% to obtain a SBR.

Production Example 2: Production of Plasticizer 5 (Liquid SBR)

After adding 20 mL of a 1.0 mol/L n-butyllithium/hexane solution, 200 mL of hexane, and 60 mL of tetrahydrofuran to an autoclave reactor subjected to nitrogen purge, the mixture was stirred at a stirring speed of 80 rpm and a jacket temperature at 80° C. while adding a monomer solution in which 75 g of 1,3-butadiene and 25 g of styrene were dissolved in 400 mL of hexane so that the temperature of the reaction solution did not exceed 90° C. After confirming production of a polymer having a Mw of 5000 by GPC, a polymerization solution was poured into 4 L of ethanol to collect a precipitate. After blow-drying the obtained precipitate, it was dried under reduced pressure at 80° C./10 Pa or lower until a drying loss became 0.1%. As a result of analyzing the obtained liquid by DSC, a Tg was −25° C.

Production Example 3: Production of Plasticizer 6 (Liquid SBR)

After adding 20 mL of a 1.0 mol/L n-butyllithium/hexane solution, 200 mL of hexane, and 60 mL of tetrahydrofuran to an autoclave reactor subjected to nitrogen purge, the mixture was stirred at a stirring speed of 80 rpm and a jacket temperature at 80° C. while adding a monomer solution in which 60 g of 1,3-butadiene and 40 g of styrene were dissolved in 400 mL of hexane so that the temperature of the reaction solution did not exceed 90° C. After confirming production of a polymer having a Mw of 5000 by GPC, a polymerization solution was poured into 4 L of ethanol to collect a precipitate. After blow-drying the obtained precipitate, it was dried under reduced pressure at 80° C./10 Pa or lower until a drying loss became 0.1%. As a result of analyzing the obtained liquid by DSC, a Tg was −5° C.

[Reference Example]

(Preparation of Vulcanized Rubber Sheet)

According to the compounding formulations shown in Tables 1 and 2, using a 1.7 L closed Banbury mixer, all chemicals other than sulfur and vulcanization accelerators were kneaded until a temperature reached a discharge temperature at 150° C. to 160° C. for 1 to 10 minutes to obtain a kneaded product. Next, using a twin-screw open roll, sulfur and vulcanization accelerators were added to the obtained kneaded product, and the mixture was kneaded for 4 minutes until the temperature reached 105° C. to obtain an unvulcanized rubber composition. The obtained unvulcanized rubber composition was vulcanized at 160° C. for 8 minutes and cut into a piece of 40 mm in length×40 mm in width×2 mm in thickness to prepare a vulcanized rubber sheet.

(Measurement of Diffusion Velocity of Plasticizer)

According to the combination in Table 3, the vulcanized rubber sheets of the first layer and the second layer were attached together and left to stand under a condition of a temperature at 80° C. for 480 hours while being applied with a load of 500 g from the first layer to the second layer. Then, the vulcanized rubber sheets was separated into a first layer and a second layer, respectively, to measure a weight of the second layer, and the measurement was indexed with an initial weight of the second layer before being applied with a load being as 100. The results show that the larger the index is, the larger the amount of the plasticizer compounded in the first layer that diffuses into the second layer is, and the faster the diffusion velocity of the plasticizer is. As a result of Table 3, it was found that a diffusion velocity of plasticizers was fast from the plasticizer 1, the plasticizer 2, the plasticizer 3, the plasticizer 4, the plasticizer 5, and the plasticizer 6 in the order.

TABLE 1

| Compounding amount | Compounding of first layer | | | | | |
|---|---|---|---|---|---|---|
| (part by mass) | A1 | A2 | A3 | A4 | A5 | A6 |
| SBR | 10 | 10 | 10 | 10 | 10 | 10 |
| BR | 30 | 30 | 30 | 30 | 30 | 30 |
| NR | 60 | 60 | 60 | 60 | 60 | 60 |
| Carbon black | 30 | 30 | 30 | 30 | 30 | 30 |
| Silica | 60 | 60 | 60 | 60 | 60 | 60 |
| Silane coupling agent | 4.8 | 4.8 | 4.8 | 4.8 | 4.8 | 4.8 |
| Plasticizer 1 | 45 | — | — | — | — | — |
| Plasticizer 2 | — | 45 | — | — | — | — |
| Plasticizer 3 | — | — | 45 | — | — | — |
| Plasticizer 4 | — | — | — | 45 | — | — |
| Plasticizer 5 | — | — | — | — | 45 | — |
| Plasticizer 6 | — | — | — | — | — | 45 |
| Stearic acid | 1.0 | 1.0 | 1.0 | 1.0 | 1.0 | 1.0 |
| Zinc oxide | 1.0 | 1.0 | 1.0 | 1.0 | 1.0 | 1.0 |
| Vulcanization accelerator 1 | 2.0 | 2.0 | 2.0 | 2.0 | 2.0 | 2.0 |
| Vulcanization accelerator 2 | 2.0 | 2.0 | 2.0 | 2.0 | 2.0 | 2.0 |
| Sulfur | 1.0 | 1.0 | 1.0 | 1.0 | 1.0 | 1.0 |

TABLE 2

| Compounding of second layer | B1 |
|---|---|
| Compounding amount (part by mass) | |
| SBR | 10 |
| BR | 30 |
| NR | 60 |
| Carbon black | 30 |
| Silica | 60 |
| Silane coupling agent | 4.8 |
| Stearic acid | 1.0 |
| Zinc oxide | 1.0 |
| Vulcanization accelerator 1 | 2.0 |
| Vulcanization accelerator 2 | 2.0 |
| Sulfur | 1.0 |

TABLE 3

| Compounding of first layer | A1 | A2 | A3 | A4 | A5 | A6 |
|---|---|---|---|---|---|---|
| Compounding of second layer | B1 | B1 | B1 | B1 | B1 | B1 |
| Rate of change in weight of second layer (%) | 10 | 9 | 6 | 5 | 3 | 1 |

EXAMPLES AND COMPARATIVE EXAMPLES

According to the compounding formulations shown in Table 4, using a 1.7 L closed Banbury mixer, all chemicals other than sulfur and vulcanization accelerators were kneaded until reaching a discharge temperature at 150° C. to 160° C. for 1 to 10 minutes to obtain a kneaded product. Next, using a twin-screw open roll, sulfur and vulcanization accelerators were added to the obtained kneaded product, and the mixture was kneaded for 4 minutes until the temperature reached 105° C. to obtain an unvulcanized rubber composition. The obtained unvulcanized rubber composition was molded into each shape of the first layer and the second layer of the tread, and attached together with other tire members, preparing an unvulcanized tire, followed by vulcanized at 170° C. to obtain each test tire shown in Table 5 (size: 205/65R15, rim: 15×6JJ, internal pressure: 230 kPa).

<Dynamic Test>

A vulcanized rubber test piece was cut out with 30 mm in length×30 mm in width×10 mm in thickness from a tread part of the tire, including an interface between a first layer and a second layer, so that thicknesses of the first layer and the second layer became the same. Besides, a long side of the sample was defined as a tire circumferential direction, and a thickness direction of the sample was defined as a tire radial direction. For each vulcanized rubber test piece, a dynamic stimulus was applied in a direction perpendicular to the attached surface for 120 hours under a condition of a dynamic stress of 0.45 MPa, a frequency of 50 Hz, and a temperature at 80° C., using a dynamic viscoelastic device (e.g., EPLEXOR series manufactured by gabo Systemtechnik GmbH).

<Measurement of Acetone Extraction Amount (AE Amount)>

An AE amount was measured for each of the vulcanized rubber test pieces before and after applying a dynamic stimulus. The AE amount was calculated by the following equation by immersing each vulcanized rubber test piece (1 mm in length×1 mm in width×1 mm in thickness) in acetone for 24 hours to extract a soluble component and measuring a mass of each test piece before and after extraction. Moreover, a rate of change (%) in acetone extraction amount of the rubber composition of the first layer before and after applying a dynamic stimulus was calculated by the following equation.

$$\text{Acetone extraction amount (\%)} = \{(\text{mass of vulcanized rubber test piece before extraction} - \text{mass of vulcanized rubber test piece after extraction})/(\text{mass of rubber test piece before extraction})\} \times 100$$

$$(\text{Rate of change in acetone extraction amount before and after applying dynamic stimulus (\%)}) = \{(\text{acetone extraction amount after applying dynamic stimulus})/(\text{acetone extraction amount before applying dynamic stimulus}) \times 100\} - 100$$

<Measurement of 0° C. Tan δ and 0° C. E*>

0° C. tan δ and 0° C. E* were measured for each of the vulcanized rubber test pieces before and after applying a dynamic stimulus. For each vulcanized rubber test piece (20 mm in length×4 mm in width×1 mm in thickness), using a dynamic viscoelasticity measuring device (EPLEXOR series manufactured by gabo Systemtechnik GmbH), 0° C. tan δ and 0° C. E* were measured under a condition of a temperature at 0° C., an initial strain of 10%, a dynamic strain of 2.5%, and a frequency of 10 Hz. Moreover, a rate of change (%) in 0° C. tan δ and a rate of change (%) in 0° C. E* of the rubber composition of the first layer before and after applying a dynamic stimulus were calculated by the following equations, respectively.

$$(\text{Rate of change in 0° C. tan δ before and after applying dynamic stimulus (\%)}) = \{(\text{0° C. tan δ after applying dynamic stimulus})/(\text{0° C. tan δ before applying dynamic stimulus}) \times 100\} - 100$$

$$(\text{Rate of change in 0° C. E* before and after applying dynamic stimulus (\%)}) = \{(\text{0° C. E* after applying dynamic stimulus})/(\text{0° C. E* before applying dynamic stimulus}) \times 100\} - 100$$

<Measurement of 30° C. Tan δ>

For each vulcanized rubber test piece produced by being cut out with 20 mm in length×4 mm in width×1 mm in thickness from inside of a rubber layer of a tread part of each test tire so that a tire circumferential direction became on a long side, using the dynamic viscoelasticity measuring device (EPLEXOR series manufactured by gabo Systemtechnik GmbH), a loss tangent tan δ was measured under a condition of a temperature at 30° C., an initial strain of 5%, a dynamic strain of 1%, and a frequency of 10 Hz. Besides, a thickness direction of a sample was defined as a tire radial direction.

<Measurement of Glass Transition Temperature (Tg)>

For each vulcanized rubber test piece produced by being cut out with 20 mm in length×4 mm in width×1 mm in thickness from inside of a rubber layer of a tread part of each test tire so that a tire circumferential direction became on a long side, a temperature distribution curve of a loss tangent tan δ was measured under a condition of a frequency of 10 Hz and an elongational strain of 2.5%, using the dynamic viscoelasticity measuring device (EPLEXOR series manufactured by gabo Systemtechnik GmbH), and a temperature corresponding to the largest tan δ value in the obtained temperature distribution curve (tan δ peak temperature) was defined as a glass transition temperature (Tg). Besides, a thickness direction of a sample was defined as a tire radial direction.

<Tensile Test>

A dumbbell-shaped No. 7 test piece with a thickness of 1 mm, which was cut out from inside of a rubber layer of a tread part of each test tire so that a tire circumferential direction became a tensile direction, was prepared, and according to JIS K 6251: 2017 "Rubber, vulcanized or thermoplastics-Determination of tensile stress-strain properties", a tensile test was conducted under a condition of a tensile speed of 3.3 mm/sec in an atmosphere of 23° C. to measure an elongation at break EB (%). Besides, a thickness direction of a sample was defined as a tire radial direction.

<Wet Grip Performance after Abrasion>

A tread part was worn along a tread radius so that a thickness of a first layer of each test tire became 50% of that in mint condition, and these tires were mounted on all wheels of the vehicle (domestic FF2000 cc), to measure a braking distance from a point where a brake was applied at a speed of 100 km/h on a wet asphalt road surface. An inverse value of a braking distance of each test tire was indicated as an index according to the following equation, with calculation of a braking distance of the control tire (Comparative example 3) being as 100. The results show that the higher the index is, the more the wet grip performance after abrasion is maintained.

$$(\text{Wet grip performance index after abrasion}) = (\text{braking distance after abrasion of control tire})/(\text{braking distance after abrasion of each test tire})$$

TABLE 4

| Compounding amount (part by mass) | Compounding of first layer | | | | | | | | | | Compounding of second layer | | | |
|---|---|---|---|---|---|---|---|---|---|---|---|---|---|---|
| | A1 | A7 | A8 | A9 | A10 | A11 | A12 | A13 | A14 | A15 | B2 | B3 | B4 | B5 |
| SBR | 10 | 10 | 10 | 10 | 10 | 10 | 10 | 10 | 10 | 90 | 10 | 10 | 10 | — |
| BR | 30 | 30 | 30 | 30 | 30 | 30 | 30 | 30 | 30 | 10 | 30 | 30 | 30 | 40 |
| NR | 60 | 60 | 60 | 60 | 60 | 60 | 60 | 60 | 60 | — | 60 | 60 | 60 | 60 |
| Carbon black | 30 | 30 | 30 | 30 | 30 | 30 | 30 | 30 | 30 | 10 | 30 | 30 | 30 | 35 |
| Silica | 60 | 60 | 60 | 60 | 60 | 60 | 60 | 60 | 60 | 95 | 60 | 60 | 60 | — |
| Silane coupling agent | 4.8 | 4.8 | 4.8 | 4.8 | 4.8 | 4.8 | 4.8 | 4.8 | 4.8 | 7.6 | 4.8 | 4.8 | 4.8 | — |
| Plasticizer 1 | 45 | 20 | 15 | 15 | 15 | 15 | 10 | 5 | — | 5 | 20 | 10 | 50 | 10 |
| Plasticizer 2 | — | 5 | 5 | 5 | 5 | 5 | 5 | 5 | 5 | 5 | — | — | — | — |
| Plasticizer 3 | — | 5 | 10 | 5 | 5 | 5 | 6 | 7 | 5 | 7 | — | — | — | — |
| Plasticizer 4 | — | 10 | 10 | 15 | 15 | 15 | 15 | 15 | 15 | 15 | — | — | — | — |
| Plasticizer 5 | — | 5 | 5 | 5 | 10 | 10 | 10 | 10 | 10 | 10 | — | — | — | — |
| Plasticizer 6 | — | — | — | — | — | 5 | 5 | 5 | — | 5 | — | — | — | — |
| Plasticizer 7 | — | — | — | — | — | — | — | — | 15 | — | — | — | — | — |
| Stearic acid | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc oxide | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization accelerator 1 | 2.0 | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator 2 | 2.0 | 2.0 | 2.0 | 2.0 | 2.0 | 2.0 | 2.0 | 2.0 | 2.0 | 2.0 | 2.0 | 2.0 | 2.0 | 2.0 |
| Sulfur | 1.0 | 1.0 | 1.0 | 1.0 | 1.0 | 1.0 | 1.0 | 1.0 | 1.0 | 1.0 | 1.0 | 1.0 | 1.0 | 1.0 |
| Acetone extraction amount (% by mass) | 20.2 | 19.9 | 21.8 | 20.8 | 22.3 | 23.9 | 22.3 | 20.6 | 22.3 | 20.1 | 11.2 | 7.0 | 21.7 | 10.1 |
| 30° C. tan δ | 0.10 | 0.14 | 0.21 | 0.13 | 0.12 | 0.13 | 0.14 | 0.14 | 0.12 | 0.16 | 0.12 | 0.11 | 0.13 | 0.10 |
| 0° C. tan δ | 0.15 | 0.18 | 0.19 | 0.21 | 0.23 | 0.24 | 0.26 | 0.25 | 0.21 | 0.28 | 0.17 | 0.15 | 0.18 | 0.21 |
| 0° C. E* (MPa) | 9.8 | 10.2 | 10.2 | 10.6 | 10.6 | 10.8 | 12.0 | 12.0 | 8.2 | 17.2 | 12.2 | 14.6 | 6.8 | 7.3 |
| Tg (° C.) | -40 | -25 | -24 | -28 | -25 | -23 | -22 | -22 | -38 | -19 | -38 | -40 | -43 | -45 |
| EB (%) | 578 | 560 | 555 | 553 | 531 | 535 | 538 | 538 | 560 | 490 | 520 | 490 | 550 | 560 |

TABLE 5

| | Comparative example | | | Example | | | | | | | | | | |
|---|---|---|---|---|---|---|---|---|---|---|---|---|---|---|
| | 1 | 2 | 3 | 1 | 2 | 3 | 4 | 5 | 6 | 7 | 8 | 9 | 10 |
| Compounding of first layer | A1 | A7 | A8 | A8 | A9 | A10 | A11 | A12 | A13 | A14 | A8 | A15 | A13 |
| Compounding of second layer | B2 | B2 | B4 | B2 | B2 | B2 | B2 | B2 | B2 | B2 | B3 | B2 | B5 |
| t1 | 7.0 | 7.0 | 7.0 | 7.0 | 7.0 | 8.0 | 8.0 | 8.0 | 8.0 | 8.0 | 8.0 | 8.0 | 8.0 |
| t2 | 3.0 | 3.0 | 3.0 | 3.0 | 3.0 | 2.0 | 2.0 | 2.0 | 2.0 | 2.0 | 2.0 | 2.0 | 2.0 |
| AE₁ (% by mass) | 20.2 | 19.9 | 21.8 | 21.8 | 20.8 | 22.3 | 23.9 | 22.3 | 20.6 | 22.3 | 21.7 | 20.1 | 20.6 |
| AE₂ (% by mass) | 11.2 | 11.2 | 21.7 | 11.2 | 11.2 | 11.2 | 11.2 | 11.2 | 11.2 | 11.2 | 7.0 | 1.2 | 10.1 |
| AE₁ − AE₂ (% by mass) | 9.0 | 8.7 | 0.1 | 10.6 | 9.6 | 11.1 | 12.7 | 11.1 | 9.4 | 11.1 | 14.7 | 8.9 | 10.5 |
| Before dynamic test Physical property | | | | | | | | | | | | | |
| Acetone extraction amount (% by mass) | 20.2 | 19.9 | 21.8 | 21.8 | 20.8 | 22.3 | 23.9 | 22.3 | 20.6 | 22.3 | 21.8 | 20.1 | 20.6 |
| 30° C. tan δ | 0.10 | 0.14 | 0.21 | 0.21 | 0.13 | 0.12 | 0.13 | 0.14 | 0.14 | 0.12 | 0.21 | 0.16 | 0.14 |
| 0° C. tan δ | 0.15 | 0.18 | 0.19 | 0.19 | 0.21 | 0.23 | 0.24 | 0.26 | 0.25 | 0.21 | 0.19 | 0.28 | 0.25 |
| 0° C. E* (MPa) | 9.8 | 10.2 | 10.2 | 10.2 | 10.6 | 10.6 | 10.8 | 12.0 | 12.0 | 8.2 | 10.2 | 17.2 | 12.0 |
| Tg (° C.) | -40 | -25 | -24 | -24 | -28 | -25 | -23 | -22 | -22 | -38 | -24 | -19 | -22 |
| EB (%) | 578 | 56 | 555 | 555 | 553 | 531 | 535 | 538 | 538 | 560 | 555 | 490 | 538 |
| After dynamic test Physical property | | | | | | | | | | | | | |
| Acetone extraction amount (% by mass) | 14.2 | 17.5 | 20.2 | 20.1 | 19.9 | 20.2 | 21.6 | 20.4 | 19.4 | 20.5 | 19.6 | 19.2 | 19.8 |
| 0° C. tan δ | 0.13 | 0.15 | 0.18 | 0.18 | 0.21 | 0.23 | 0.24 | 0.26 | 0.25 | 0.21 | 0.19 | 0.28 | 0.25 |
| 0° C. E* (MPa) | 13.3 | 12.5 | 10.6 | 11.8 | 11.9 | 12.1 | 12.3 | 12.8 | 12.6 | 10.7 | 12.0 | 18.1 | 13.1 |
| Evaluation | | | | | | | | | | | | | |
| Rate of change in acetone extraction amount (%) | -30 | -12 | -7 | -8 | -4 | -9 | -10 | -9 | -6 | -8 | -10 | -5 | -4 |

TABLE 5-continued

| | Comparative example | | | Example | | | | | | | | | |
|---|---|---|---|---|---|---|---|---|---|---|---|---|---|
| | 1 | 2 | 3 | 1 | 2 | 3 | 4 | 5 | 6 | 7 | 8 | 9 | 10 |
| Rate of change in 0° C. tan δ (%) | −13 | −17 | −5 | −5 | 0 | 0 | 0 | 0 | 0 | 0 | 0 | 0 | 0 |
| Rate of change in 0° C. E* (%) | 36 | 23 | 4 | 16 | 12 | 14 | 14 | 7 | 5 | 30 | 18 | 5 | 9 |
| Wet grip performance index | 91 | 92 | 100 | 102 | 104 | 104 | 104 | 105 | 106 | 104 | 103 | 113 | 107 |

From the results in Tables 4 and 5, it can be found that, in the tire of the present invention, a changes in hardness of the tread over time is suppressed to maintain a high wet grip performance even after abrasion.

EMBODIMENTS

Examples of embodiments of the present invention are shown below.

[1] A tire comprising a tread at least having a first layer constituting a tread surface and a second layer adjacent to an inner side of the first layer in a radial direction, wherein the first layer and the second layer are each composed of a rubber composition comprising a rubber component and a plasticizer (preferably a plasticizer comprising at least one of oil and an ester-based plasticizer and at least one of a resin component and a liquid polymer; more preferably a plasticizer comprising oil, a resin component, and a liquid polymer), wherein a difference $(AE_1 - AE_2)$ between an acetone extraction amount $AE_1$ of the rubber composition of the first layer and an acetone extraction amount $AE_2$ of the rubber composition of the second layer is greater than 6.0% by mass (preferably 7.0% by mass or more, more preferably 8.0% by mass or more, further preferably 9.0% by mass or more), and wherein, with the first layer and the second layer being attached together, when they are applied with a dynamic stimulus under a condition of a dynamic stress of 0.45 MPa, a frequency of 50 Hz, and a temperature at 80° C. for 120 hours, a rate of change in acetone extraction amount of the rubber composition of the first layer before and after being applied with the dynamic stimulus is −10% or more and 10% or less (preferably −10% or more and 3% or less, more preferably −10% or more and −1% or less).

[2] The tire of [1] above, wherein a tan δ at 30° C. of the rubber composition of the first rubber layer is less than 0.20.

[3] The tire of [1] above, wherein a tan δ at 30° C. of the rubber composition of the first rubber layer is less than 0.15.

[4] The tire of any one of [1] to [3] above, wherein the plasticizer comprises at least one of oil and an ester-based plasticizer.

[5] The tire of any one of [1] to [4] above, wherein the plasticizer comprises at least one of a resin component and a liquid polymer.

[6] The tire of any one of [1] to [5] above, wherein a difference between a content of the plasticizer in the rubber composition of the first layer and a content of the plasticizer in the rubber composition of the second layer, based on 100 parts by mass of the rubber component, is 10 parts by mass or more (preferably 15 parts by mass or more, more preferably 20 parts by mass or more, further preferably 25 parts by mass or more).

[7] The tire of any one of [1] to [6] above, wherein a rate of change in complex elastic modulus at 0° C. (0° C. E*) of the rubber composition of the first layer before and after being applied with the dynamic stimulus is greater than −20% and less than 20% (preferably greater than −5% and less than 19%, more preferably greater than −1% and less than 19%, further preferably greater than 3% and less than 18%).

[8] The tire of any one of [1] to [7] above, wherein a rate of change in tan δ at 0° C. (0° C. tan δ) of the rubber composition of the first layer before and after being applied with the dynamic stimulus is greater than −20% and less than 20% (preferably greater than −10% and less than 10%, more preferably greater than −6% and less than 6%).

[9] The tire of any one of [1] to [8] above, wherein 0° C. E* of the rubber composition of the first layer is 4.0 MPa or more (preferably 5.0 MPa or more, more preferably 6.0 MPa or more, further preferably 7.0 MPa or more).

[10] The tire of any one of [1] to [9] above, wherein 0° C. tan δ of the rubber composition of the first layer is 0.10 or more (preferably 0.12 or more, more preferably 0.15 or more, further preferably 0.18 or more).

[11] The tire of any one of [1] to [10] above, wherein a glass transition temperature of the rubber composition of the first layer is −40° C. or higher (preferably −35° C. or higher, more preferably −30° C. or higher).

[12] The tire of any one of [1] to [11] above, wherein an elongation at break of the rubber composition of the first layer measured according to JIS K 6251: 2017 is 200% or more (preferably 300% or more, more preferably 400% or more, further preferably 500% above).

REFERENCE SIGNS LIST

1. Tread surface
2. First layer
3. Second layer
4. Third layer

The invention claimed is:

1. A tire comprising a tread at least having a first layer constituting a tread surface and a second layer adjacent to an inner side of the first layer in a radial direction, wherein the first layer and the second layer are each composed of a rubber composition comprising a rubber component and a plasticizer, wherein a difference $(AE_1 - AE_2)$ between an acetone extraction amount $AE_1$ of the rubber composition of the first layer and an acetone extraction amount $AE_2$ of the rubber composition of the second layer is greater than 6.0% by mass, wherein, with the first layer and the second layer being attached together, when they are applied with a dynamic stimulus under a condition of a dynamic stress of 0.45 MPa, a frequency of 50 Hz, and a temperature at 80° C. for 120 hours, a rate of change in acetone extraction amount of the rubber composition of the first layer before and after being applied with the dynamic stimulus is −10% or more and 10% or less, wherein the rubber composition of the first rubber layer comprises natural rubber in an amount of 60% by mass or more based on 100% by mass of the rubber component in the rubber composition of the first rubber layer, and wherein an acetone extraction amount of the second layer before being applied with the dynamic stimulus is more than 10.0% by mass.

2. The tire of claim 1, wherein a tan δ at 30° C. of the rubber composition of the first rubber layer is less than 0.20.

3. The tire of claim 1, wherein a tan δ at 30° C. of the rubber composition of the first rubber layer is less than 0.15.

4. The tire of claim 1, wherein the plasticizer comprises at least one of oil and an ester-based plasticizer.

5. The tire of claim 1, wherein the plasticizer comprises at least one of a resin component and a liquid polymer.

6. The tire of claim 1, wherein a difference between a content of the plasticizer in the rubber composition of the first layer and a content of the plasticizer in the rubber composition of the second layer, based on 100 parts by mass of the rubber component, is 10 parts by mass or more.

7. The tire of claim 1, wherein a rate of change in complex elastic modulus at 0° C. (0° C. E*) of the rubber composition of the first layer before and after being applied with the dynamic stimulus is greater than −20% and less than 20%.

8. The tire of claim 1, wherein a rate of change in tan δ at 0° C. (0° C. tan δ) of the rubber composition of the first layer before and after being applied with the dynamic stimulus is greater than −20% and less than 20%.

9. The tire of claim 1, wherein 0° C. E* of the rubber composition of the first layer is 4.0 MPa or more.

10. The tire of claim 1, wherein 0° C. tan δ of the rubber composition of the first layer is 0.10 or more.

11. The tire of claim 1, wherein a glass transition temperature of the rubber composition of the first layer is −40° C. or higher.

12. The tire of claim 1, wherein an elongation at break of the rubber composition of the first layer measured according to JIS K 6251: 2017 is 200% or more.

* * * * *